(12) United States Patent
Sugiura et al.

(10) Patent No.: US 8,698,989 B2
(45) Date of Patent: Apr. 15, 2014

(54) LIQUID CRYSTAL DISPLAY DEVICE WITH A SWITCHABLE VIEWING ANGLE COMPRISING A PLURALITY OF COLOR SUB-PIXELS AND A PLURALITY OF VIEWING ANGLE CONTROL SUB-PIXELS

(75) Inventors: Norio Sugiura, Hsin-Chu (TW);
Chao-Wei Yeh, Hsin-Chu (TW);
Chia-Hsuan Tai, Hsin-Chu (TW);
Chien-Huang Liao, Hsin-Chu (TW);
Wen-Hao Hsu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 327 days.

(21) Appl. No.: 13/008,028

(22) Filed: Jan. 18, 2011

(65) Prior Publication Data
US 2012/0013825 A1     Jan. 19, 2012

(30) Foreign Application Priority Data

Jul. 15, 2010    (TW) ................................. 99123271 A

(51) Int. Cl.
*G02F 1/1343*     (2006.01)
*G02F 1/1337*     (2006.01)

(52) U.S. Cl.
USPC ............................ 349/141; 349/130; 349/132

(58) Field of Classification Search
USPC ......... 349/41–43, 49, 87, 102, 103, 113, 123, 349/139–144, 146
See application file for complete search history.

(56) References Cited

U.S. PATENT DOCUMENTS

| | | | |
|---|---|---|---|
| 7,522,242 B2 | 4/2009 | Momoi | |
| 2007/0121047 A1 | 5/2007 | Chung | |
| 2007/0153196 A1 | 7/2007 | Jang | |
| 2009/0231530 A1 | 9/2009 | Nishimura | |
| 2010/0128208 A1* | 5/2010 | Kurasawa | 349/106 |
| 2011/0058115 A1* | 3/2011 | Matsushima et al. | 349/42 |

FOREIGN PATENT DOCUMENTS

| | | |
|---|---|---|
| JP | 2007178904 | 7/2007 |
| JP | 2007178907 | 7/2007 |
| TW | 200951554 A1 | 12/2009 |

* cited by examiner

*Primary Examiner* — Paul Lee
(74) *Attorney, Agent, or Firm* — Winston Hsu; Scott Margo

(57) ABSTRACT

A viewing angle switchable liquid crystal display panel includes a first substrate, a second substrate, a liquid crystal layer disposed between the first substrate and the second substrate, a plurality of color sub-pixels and a plurality of viewing angle control (VAC) pixels. The liquid crystal layer includes liquid crystal molecules sandwiched between the first substrate and the second substrate. The liquid crystal molecules of each color sub-pixel include twisted nematic liquid crystal molecules. Each of the color sub-pixels includes a first pixel electrode disposed on an inner surface of the first substrate, and a second pixel electrode disposed on an inner surface of the second substrate. Each of the viewing angle control pixels includes a first electrode and a second electrode disposed on the inner surface of the first substrate, and a third electrode disposed on the inner surface of the second substrate.

39 Claims, 13 Drawing Sheets

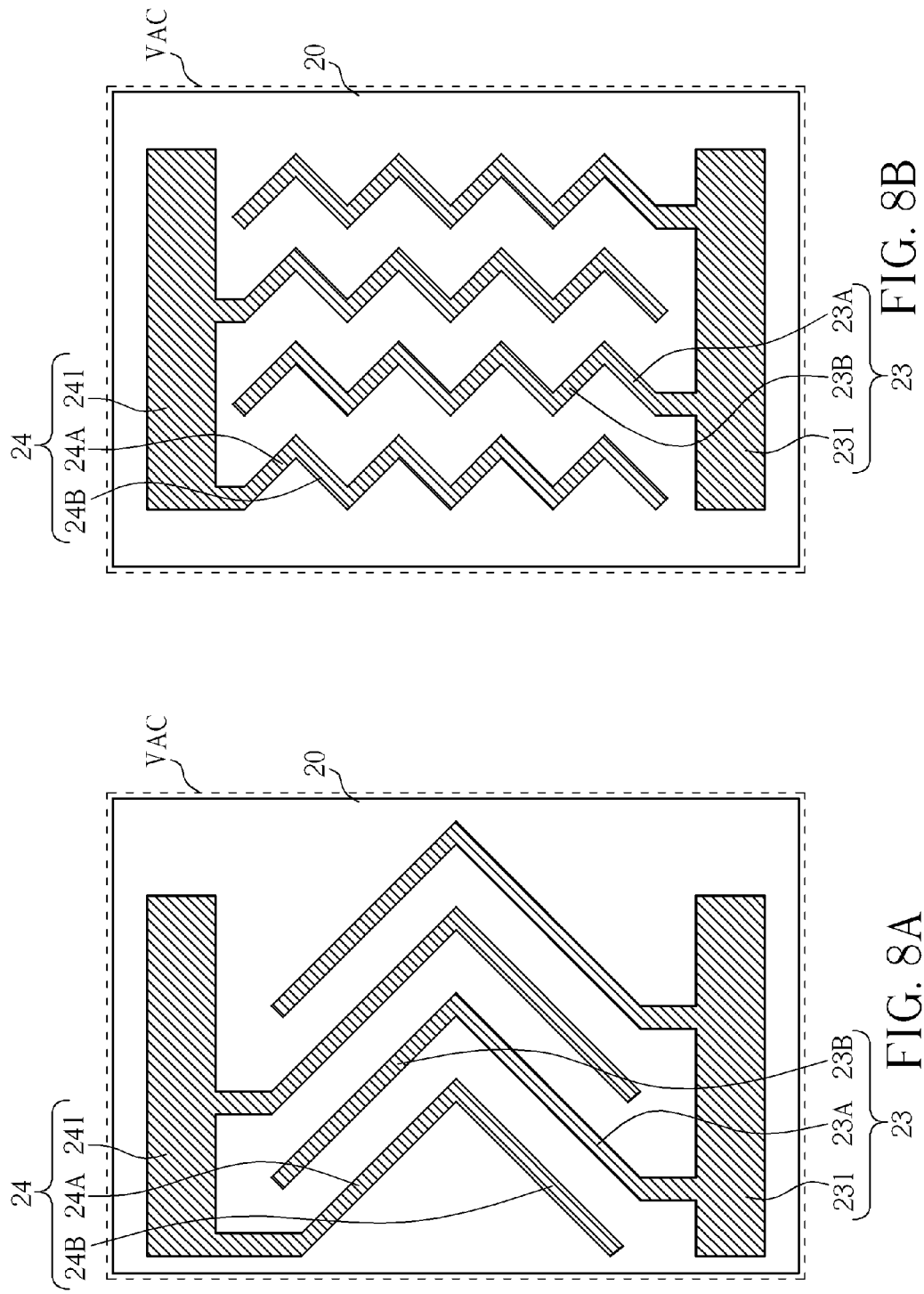

LIQUID CRYSTAL DISPLAY DEVICE WITH A SWITCHABLE VIEWING ANGLE COMPRISING A PLURALITY OF COLOR SUB-PIXELS AND A PLURALITY OF VIEWING ANGLE CONTROL SUB-PIXELS

BACKGROUND OF THE INVENTION

1. Field of the Invention

The present invention relates to a viewing angle switchable liquid crystal display panel, and more particularly, to a liquid crystal display panel having viewing angle control sub-pixels, wherein under a narrow viewing angle display mode, the viewing angle control sub-pixels do not provide light leakage interference in a front viewing direction but provides light leakage interference in a side viewing direction, and under a wide viewing angle display mode, the viewing angle control sub-pixels can be used to enhance luminance in the front viewing angle and in the side viewing angle without influence on display qualities.

2. Description of the Prior Art

In general, display panels usually have wide viewing angle display performance for providing pictures to multiple viewers, but sometimes or under some occasions, such as reading secret information and entering passwords, the secret information can be easily peeked by people around under the wide viewing angle display mode and be released to other people. Therefore, for satisfying both the demand of providing pictures to multiple viewers and the demand of handling secret information in public occasions, the viewing angle switchable display panel with an ability to switch between wide viewing angle display mode and narrow viewing angle display mode gradually becomes one of the main stream merchandise in the display market.

The conventional anti-peeking mechanisms applied on display could be substantially divided into several technologies listed below:

1. Directly Adding Anti-Peeking Films to Displays:

The ordinary anti-peeking films protect private matters by suppressing the luminance of large viewing angle and keeping side viewers from clearly reading the information on the display. Even though the approach is simple and the material is easy to be obtained, it is still inconvenient for users to use it because users need to manually switch between the anti-peeking mode and the normal viewing mode. In addition, the original optical properties and display qualities will be affected because this technology requires an extra optical film on a display panel.

2. Controlling the Backlight Source:

By using the backlight source with originally high collimation emitted light, and cooperating with a voltage-controllable diffusion film, such as a polymer dispersed liquid crystal (PDLC) film, the wide viewing angle display mode can be achieved by light emitted in the side viewing angle, which is caused by the collimated light diffused by the voltage-controllable diffusion film while the voltage is turned off; and when the voltage of the voltage-controllable diffusion film is turned on, the narrow viewing angle display mode can be achieved by avoiding the diffusion of the original collimated light diffused by the voltage-controllable diffusion film. This approach keeps side viewers from reading the information on the display by tuning the luminance of side viewing angle with controlling the emitted angle of backlight. This approach theoretically could perfectly prevent other people from peeking the information while it is convenient to switch between wide and narrow viewing angle display modes, but for practical applications, this approach fails to make completely collimated light due to the difficulty to control light path and this approach fails to completely suppress the luminance of large viewing angle to the non-distinguishable level, even the distribution of backlight source on large viewing angle is suppressed, and therefore this approach fails to make a satisfying effect on anti-peeking 3. Adding Viewing Angle Control Module Units:

By adding an extra viewing angle control module (extra view angle control panel) on a normal display module (normal display panel), the wide viewing angle display mode and the narrow viewing angle display mode can be switched with the switch of viewing angle control module operated by voltage control. Under the wide viewing angle display mode, this approach can maintain the original image qualities without making any interference or damages to the original image displaying. And under the narrow viewing angle display mode, by apparently suppressing the luminance of side viewing angle, this approach could keep side viewers from easily reading the displayed information. But relatively, the cost is substantially raised because it is comprised by two pieces of modules and the total weight and thickness are both doubled.

According to the descriptions above, while reaching the purpose of anti-peeking by the prior art anti-peeking technologies applied on display, it is always necessary to sacrifice a part of some original properties, such as display qualities, optical properties, thickness and weight, and therefore it still leaves much room to improve for the prior art anti-peeking technologies.

SUMMARY OF THE INVENTION

It is one of the objectives of the present invention to provide a viewing angle switchable liquid crystal display panel to solve the problems of the prior art.

To achieve the purpose described above, the present invention provides a viewing angle switchable liquid crystal display panel comprising a first substrate, a second substrate, a liquid crystal layer, a plurality of color sub-pixels and a plurality of viewing angle control (VAC) pixels. The first substrate and the second substrate are disposed oppositely to each other. The liquid crystal layer includes a plurality of liquid crystal molecules sandwiched between the first substrate and the second substrate. The liquid crystal molecules of each color sub-pixel include twisted nematic (TN) liquid crystal molecules. Each of the color sub-pixels includes a first electrode disposed on an inner side of the first substrate facing the second substrate, and a second electrode disposed on an inner side of the second substrate facing the first substrate. Each of the viewing angle control pixels includes a third electrode and a fourth electrode disposed on the inner side of the first substrate facing the second substrate, and a fifth electrode disposed on the inner side of the second substrate facing the first substrate.

The viewing angle switchable liquid crystal display panel in the present invention comprises viewing angle control sub-pixels, wherein under the wide viewing angle display mode, the viewing angle control sub-pixels can make a contribution to the luminance, and under the narrow viewing angle display mode, the viewing angle control sub-pixels provide side light leakage for interfering side viewers to achieve the anti-peeking effect.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8A and FIG. 8B are schematic diagrams illustrating two variation embodiments of the in-plane switch electrode structure in the present invention.

DETAILED DESCRIPTION

To provide a better understanding of the present invention to the skilled users in the technology of the present invention, preferred embodiments will be detailed as follows. The preferred embodiments of the present invention are illustrated in the accompanying drawings with numbered elements to elaborate the contents and effects to be achieved.

Figure 1:
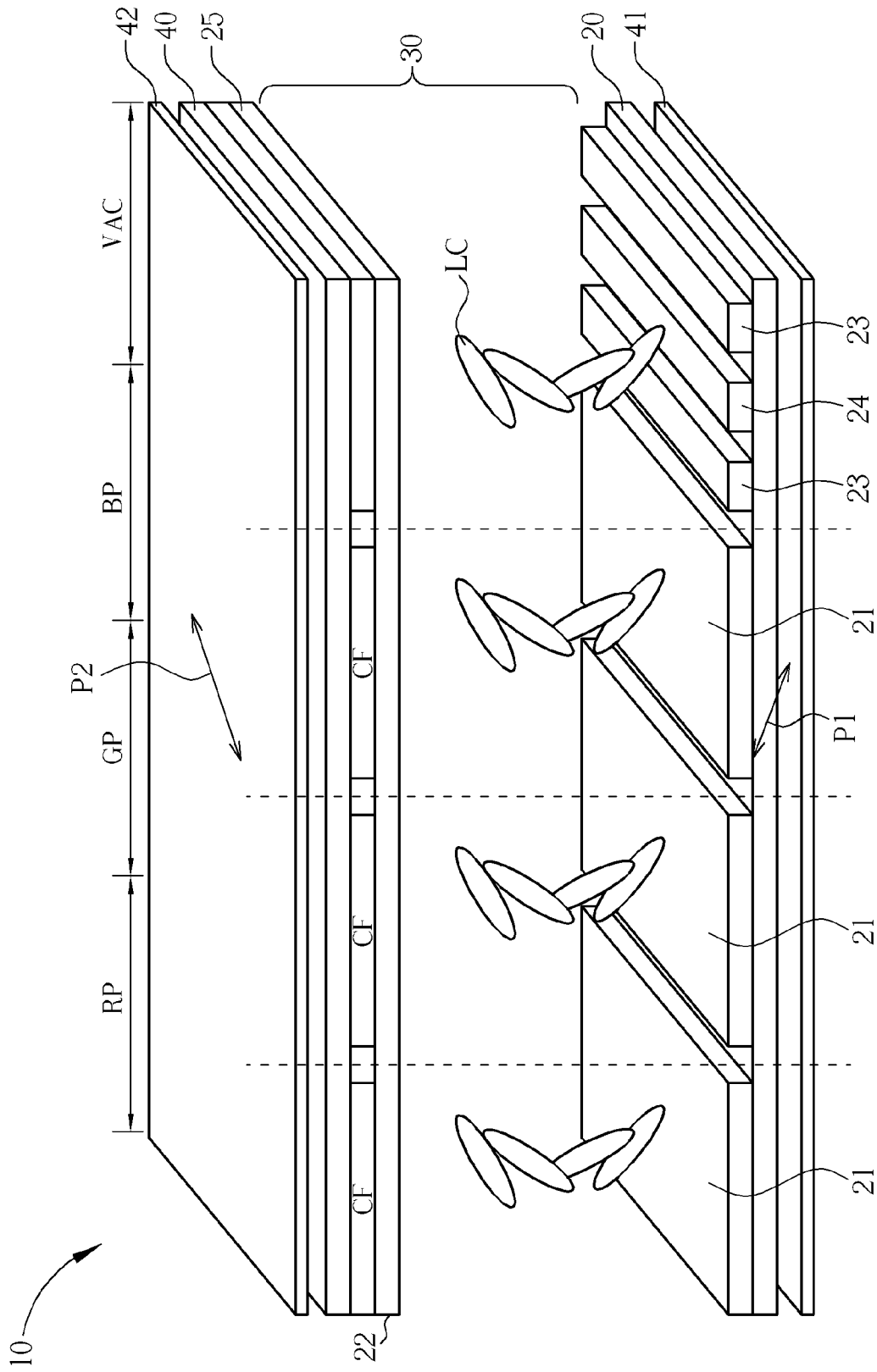
FIGS. 1-4 are schematic diagrams illustrating a viewing angle switchable liquid crystal display panel according to a preferred embodiment of the present invention.
Figure 2:
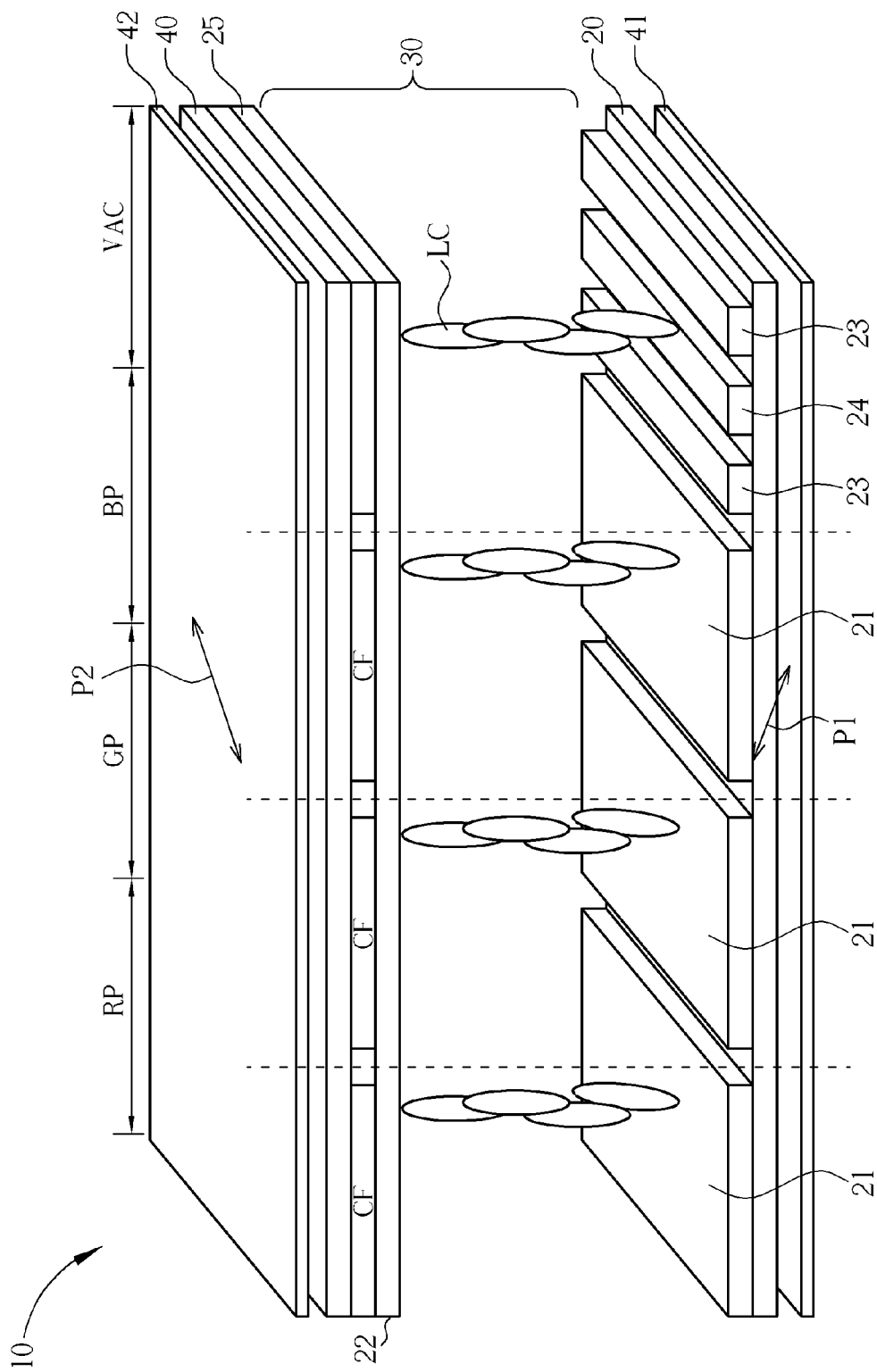
Figure 3:
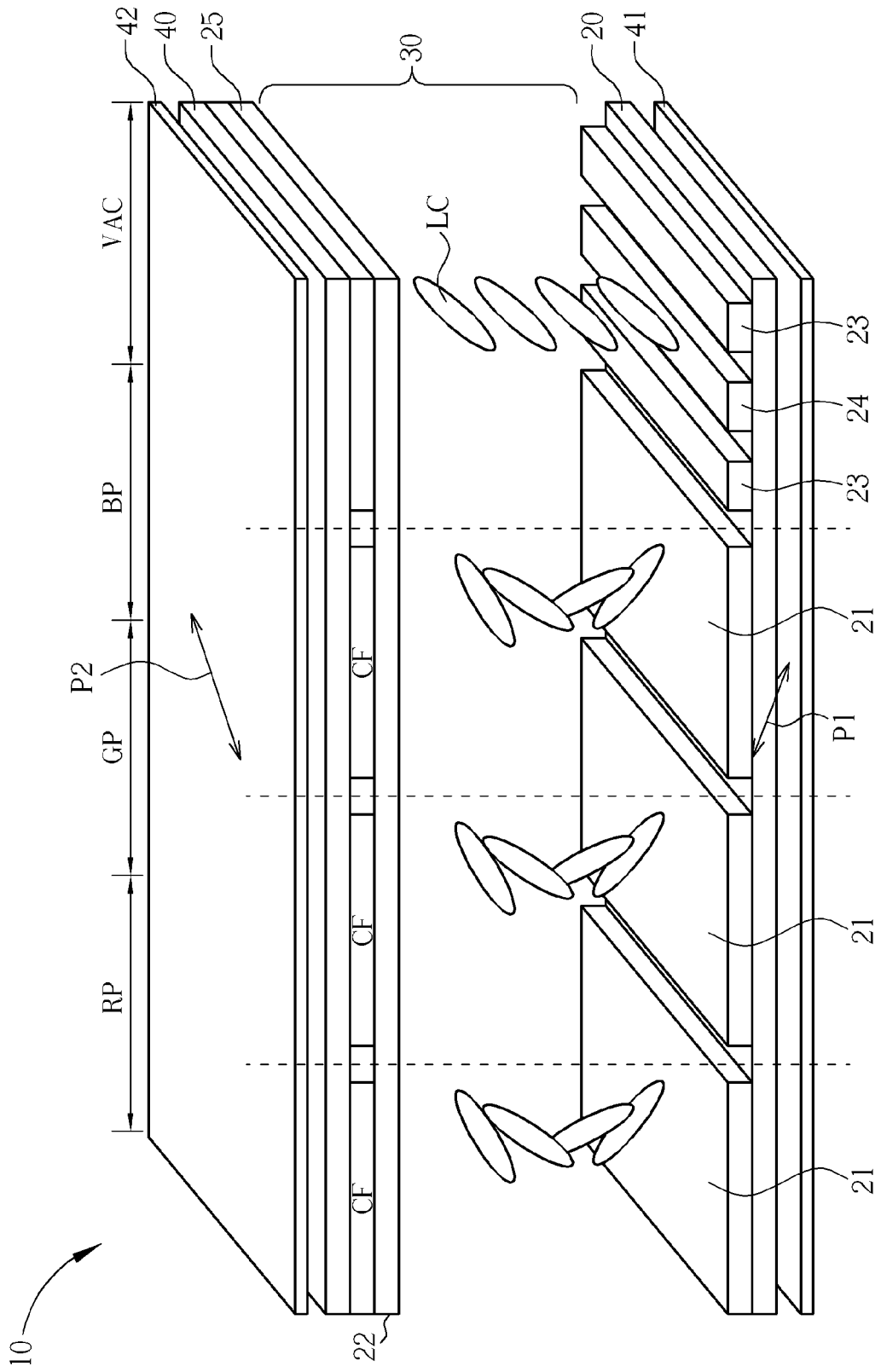
Figure 4:
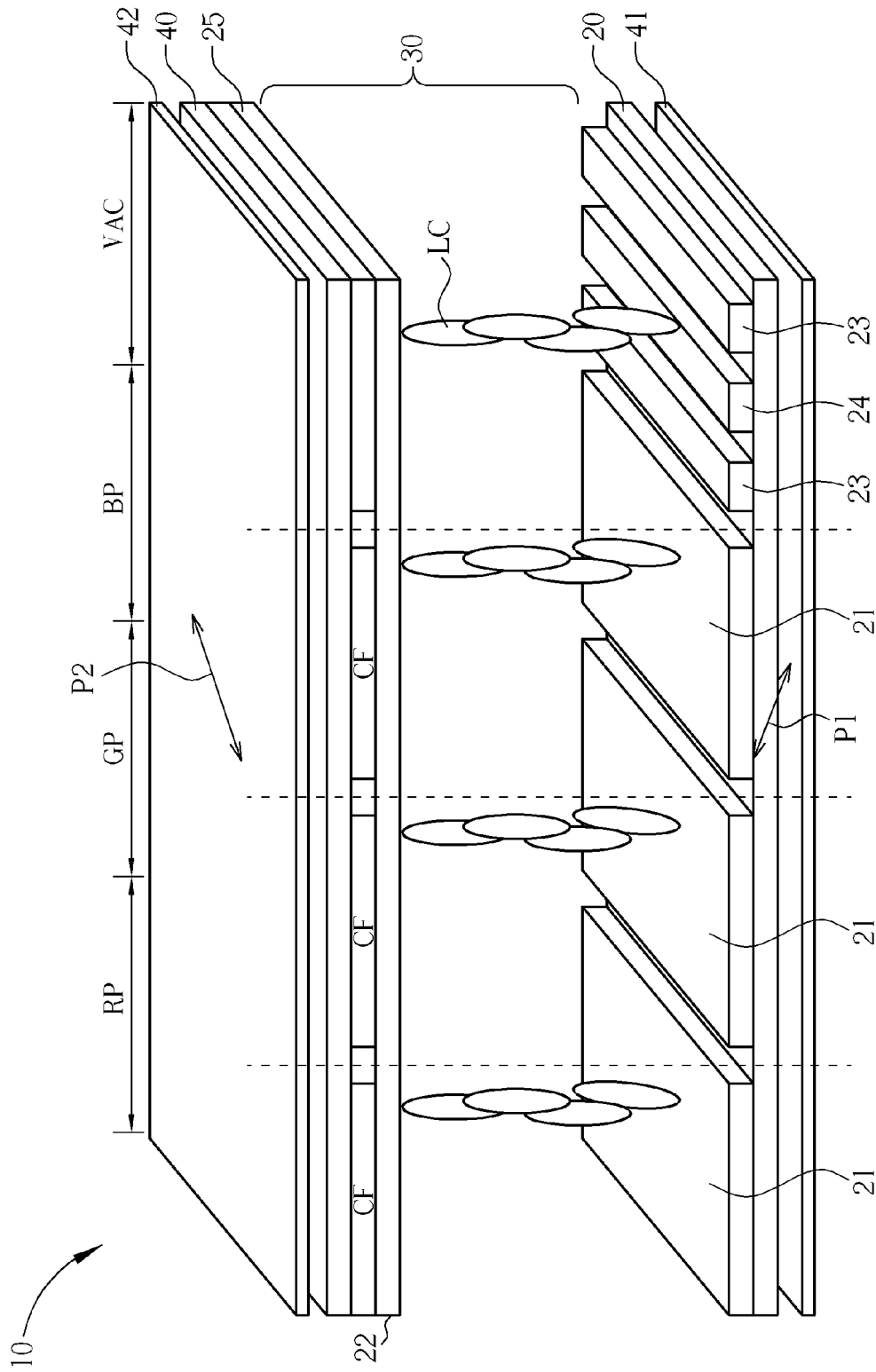

Please refer to FIGS. 1-4. FIGS. 1-4 are schematic diagrams illustrating a viewing angle switchable liquid crystal display panel according to a preferred embodiment of the present invention, wherein FIG. 1 is a schematic diagram illustrating the viewing angle switchable liquid crystal display panel under a bright state of a wide viewing angle display mode according to this embodiment, FIG. 2 is a schematic diagram illustrating the viewing angle switchable liquid crystal display panel under a dark state of the wide viewing angle display mode according to this embodiment, FIG. 3 is a schematic diagram illustrating the viewing angle switchable liquid crystal display panel under a bright state of a narrow viewing angle display mode according to this embodiment, and FIG. 4 is a schematic diagram illustrating the viewing angle switchable liquid crystal display panel under a dark state of the narrow viewing angle display mode according to this embodiment. As shown in FIGS. 1-4, the viewing angle switchable liquid crystal display panel 10 of this embodiment comprises a first substrate 20, a second substrate 40, a liquid crystal layer 30, a plurality of color sub-pixels, and a plurality of viewing angle control sub-pixels VAC. The first substrate 20 is disposed opposite to the second substrate 40, and the liquid crystal layer 30, including a plurality of liquid crystal LC molecules LC, is disposed between the first substrate 20 and the second substrate 40. The color sub-pixel includes a red sub-pixel RP, a green sub-pixel GP, and a blue sub-pixel BP. Each of the color sub-pixels comprises a first electrode 21 disposed on an inner side of the first substrate 20 facing the second substrate 40, and a second electrode 22 disposed on an inner side of the second substrate 40 facing the first substrate 20. Additionally, the liquid crystal molecule LC of each of the color sub-pixels includes a twist nematic (TN) type liquid crystal molecule, which has twist nematic performance. In this embodiment, the first substrate 20 can be such as a thin film transistor substrate (also called array substrate), the second substrate 40 can be such as a counter substrate, and under this condition, the first electrode 21 of each of the color sub-pixels is a pixel electrode electrically disconnected from one another, and the second electrode 22 is a common electrode shared by all color sub-pixels. The first substrate 20 also can be the counter substrate and the second substrate 40 can be the thin film transistor substrate, and under this condition, the first electrode 21 is the common electrode and the second electrode 22 is the pixel electrode. In addition, the viewing angle switchable liquid crystal display panel 10 can further comprises a color filter layer CF disposed on the first substrate 20 or the second substrate 40. In this embodiment, for example, the color filter layer CF is disposed on the inner side of the second substrate 40, and the color filter layer CF comprises a red color filter, a green color filter, and a blue color filter respectively corresponding to the red sub-pixel RP, the green sub-pixel GP, and the blue sub-pixel BP. In addition, the viewing angle switchable liquid crystal display panel 10 further comprises a first polarizing film 41 and a second polarizing film 42 disposed on an outer side of the first substrate 20 and an outer side of the second substrate 40, respectively, wherein the first polarizing film 41 has a first light transmitting axis P1 and the second polarizing film 42 has a second light transmitting axis P2, and the first light transmitting axis P1 and the second light transmitting axis P2 are substantially perpendicular to each other. For example, an azimuth angle of the first light transmitting axis P1 is negative 45 degrees (−45°) or positive 135 degrees (135°), and an azimuth angle of the second light transmitting axis P2 is positive 45 degrees or negative 135 degrees, but the present invention is not limited to this. Furthermore, alignment films (not shown) can be disposed respectively on the inner side of the first substrate 20 and the inner side of the second substrate 40, for aligning the liquid crystal molecules LC.

Each of the viewing angle control sub-pixels VAC comprises a third electrode 23 disposed on the inner side of the first substrate 20 facing the second substrate 40, a fourth electrode 24 disposed on the inner side of the first substrate 20 facing the second substrate 40, and a fifth electrode 25 disposed on the inner side of the second substrate 40 facing the first substrate 20. The third electrode 23 and the fourth electrode 24 do not overlap to each other in a perpendicularly projective direction. In this embodiment, the third electrode 23 and the fourth electrode 24 are disposed on the same plane, and the third electrode 23 and the fourth electrode 24 are electrically disconnected from each other accompanied with different voltages, but the present invention is not limited to this. The third electrode 23 and the fourth electrode 24 can respectively be a transparent electrode, and the third electrode 23 and the fourth electrode 24 can be made of an identical transparent conductive layer. Preferably, the third electrode 23 and the fourth electrode 24 of the viewing angle control sub-pixel VAC and the first electrode 21 of the color sub-pixel can be made of the same transparent conductive layer, for example an ITO layer, but the present invention is not limited to this. The third electrode 23 and the fourth electrode 24 also can be made of different transparent conductive layers, or be made of the same or different non-transparent conductive layer. Additionally, the fifth electrode 25 of the viewing angle control sub-pixel VAC and the second electrode 22 of the color sub-pixel can be electrically connected to each other and be made of the same transparent conductive layer, but not limited thereto. For example, the fifth electrode 25 of the viewing angle control (VAC) sub-pixel also can be electrically disconnected from the second electrode 22 of the color sub-pixel.

The viewing angle switchable liquid crystal display panel 10 of the present invention has an ability to switch between the wide viewing angle display mode and the narrow viewing angle display mode, therefore can satisfy different demands from each kinds of users. Under the bright and dark states of the wide and narrow viewing angle display modes, the operating approaches of the viewing angle switchable liquid crystal display panel of the present invention are detailed below in sequence.

As shown in FIG. 1, under the bright state of the wide viewing angle display mode, the operating approaches of the color sub-pixels and the viewing angle control sub-pixels VAC are detailed as follows. For the color sub-pixels, when there's no voltage applied on the first electrode 21 and the second electrode 22 of the color sub-pixel or there's an identical voltage applied on the first electrode 21 and the second electrode 22, no perpendicular electric field exists between the first electrode 21 and the second electrode 22. According to the pre-alignment direction of the alignment film, the azimuth angle of the liquid crystal molecule will substantially rotate from negative 45 degrees to negative 135 degrees in a viewing direction from the first electrode 21 to the second electrode 22, for example. Additionally, for the viewing angle control sub-pixels VAC, when there's no voltage applied on the third electrode 23 and the fourth electrode 24 or there's an identical voltage applied on the third electrode 23 and the fourth electrode 24, no horizontal electric field exists in the viewing angle control sub-pixel VAC; when there's no voltage applied on the fifth electrode 25 or there's an identical voltage applied on the third electrode 23 and the fourth electrode 24, no perpendicular electric field exists in the viewing angle control sub-pixel VAC. When no perpendicular and horizontal electric field exist, the liquid crystal molecules LC of the viewing angle control sub-pixels VAC and the liquid crystal molecules LC of the color sub-pixels have a same rotation mode, and in other words, the azimuth angle of the liquid crystal molecule will substantially rotate from negative 45 degrees to negative 135 degrees in a viewing direction from the first electrode 21 to the second electrode 22. Through the operating approaches described above, the liquid crystal molecules of the color sub-pixels and the viewing angle control sub-pixels VAC are substantially aligned in a twisted nematic mode, therefore both of the liquid crystal molecules LC of the color sub-pixels and the liquid crystal molecules LC of the viewing angle control sub-pixels VAC permit the backlight to pass through and make it possible for the front and the side viewers to read the pictures displayed on the viewing angle switchable liquid crystal display panel 10. It is worthy to say that due to the luminance provided from the viewing angle control sub-pixels VAC themselves under the bright state of the wide viewing angle display mode, the viewing angle control sub-pixels VAC can comprise a white filter, a color filter or even no filters under the design concerns, and the viewing angle control sub-pixels VAC can be used as white sub-pixels, color sub-pixels or transparent sub-pixels.

As shown in FIG. 2, under the dark state of the wide viewing angle display mode, the operating approaches of the color sub-pixels and the viewing angle control sub-pixels VAC are detailed as follows. For the color sub-pixels, when there are different voltages applied on the first electrode 21 and the second electrode 22 of the color sub-pixel or there's a voltage applied on one of the first electrode 21 or the second electrode 22, a perpendicular electric field exists between the first electrode 21 and the second electrode 22, and based on the existence of the perpendicular electric field, the dark state can be achieved by the liquid crystal molecules LC of the color sub-pixels standing and aligned perpendicularly and keeping the backlight from passing through the color sub-pixels. Additionally, for the viewing angle control sub-pixels VAC, there are two operating approaches. The first approach is applying no voltage to the third electrode 23 and the fourth electrode 24 or applying an identical voltage to the third electrode 23 and the fourth electrode 24 to form no horizontal electric field in the viewing angle control sub-pixels VAC, and applying a voltage, which is different from the voltage applied to the third electrode 23 and the fourth electrode 24, to the fifth electrode 25 to form a perpendicular electric field in the viewing angle control sub-pixels VAC. Based on the existence of the perpendicular electric field, the dark state can be achieved by the liquid crystal molecules LC of the viewing angle control sub-pixels standing and aligned perpendicularly and keeping the backlight from passing through the color sub-pixels. Through the operating approach described above, both of the color sub-pixels and the viewing angle control sub-pixels VAC will not permit the backlight to pass through. The second approach is applying different voltages to the third electrode 23 and the fourth electrode 24 or applying a voltage to one of the third electrode 23 and the fourth electrode 24 to form a horizontal electric field; additionally, the second approach is applying a voltage, which is identical with the voltage applied to one of the third electrode 23 and the fourth electrode 24, to the fifth electrode 25 as much as possible to maintain no perpendicular electric field or a minor perpendicular electric field existing between the fifth electrode 25 and the third electrode 23 and between the fifth electrode 25 and the fourth electrode 24. Based on the second operating approach, it can keep the viewing angle control sub-pixels VAC from providing luminance. But for practical applications, one or both of the above-mentioned first operating approach and the above-mentioned second operating approach of the viewing angle control sub-pixels VAC can be utilized, and in other words, a part of the viewing angle control sub-pixels VAC can adopt the first operating approach and another part of the viewing angle control sub-pixels VAC can adopt the second operating approach.

As shown in FIG. 3, under the bright state of the narrow viewing angle display mode, the operating approaches of the color sub-pixels and the viewing angle control sub-pixels VAC are detailed as follows. The operating approach of the color sub-pixels under the bright state of the narrow viewing display mode is similar to the operating approach of the color sub-pixels under the bight state of the wide viewing angle display mode. For the color sub-pixels, when there's no voltage applied on the first electrode 21 and the second electrode 22 of the color sub-pixel or there's an identical voltage applied on the first electrode 21 and the second electrode 22, no perpendicular electric field exists between the first electrode 21 and the second electrode 22, and according to the pre-alignment direction of the alignment film, the azimuth angle of the liquid crystal molecule LC will substantially rotate from negative 45 degrees to negative 135 degrees in a viewing direction from the first electrode 21 to the second electrode 22. Additionally, for the viewing angle control sub-pixels VAC, when there are different voltages applied to the third electrode 23 and the fourth electrode 24 or there's a voltage applied to one of the third electrode 23 and the fourth electrode 24, a horizontal electric field exists between the third electrode 23 and the fourth electrode 24, and the horizontal electric field can drive the liquid crystal molecules LC aligned homogeneously and parallel or perpendicular to one of the transmitting axis directions of the first light transmitting axis P1 and the second light transmitting axis P2 in the polarizing film; meanwhile, when there's a voltage, which is different from the voltage applied to the third electrode 23 or the fourth electrode 24, applied on the fifth electrode 25, a perpendicular electric field exists between the fifth electrode 25 and the third electrode 23 or between the fifth electrode 25 and the fourth electrode 24, and this perpendicular electric field can drive the liquid crystal molecules LC aligned in the perpendicular direction with a tilt angle. The side light leakage can be generated by the viewing angle control sub-pixels VAC with the tilt angle of the liquid crystal molecules LC under the perpendicular electric field, and under this condition, the viewing angle control sub-pixels VAC will not make a contribution to the luminance in the front viewing direction and have interference effect by the light leakage in the side viewing direction. The viewing angle control sub-pixels VAC can be disposed on any sites of the first substrate 20, and the number of the viewing angle control sub-pixels VAC can be adjusted as needed and do not need to correspond to the number of the color sub-pixels. Furthermore, the level of the perpendicular electric field and the level of the horizontal electric field can be changed by tuning the voltages of the third electrode 23, the fourth electrode 24, and the fifth electrode 25, and the tilt angle of the liquid crystal molecules LC can be further changed to control the side light leakage. For example, the viewing angle control sub-pixels VAC can include a first viewing angle control sub-pixel, a second viewing angle control sub-pixel, and a third viewing angle control sub-pixel. Under the condition with both perpendicular electric field and horizontal electric field, the liquid crystal molecules LC of the first viewing angle control sub-pixel can have a first tilt angle, and the first tilt angle is substantially between 30 degrees and 70 degrees (e.g. 45 degrees); under the condition only with perpendicular electric field and without horizontal electric field, the liquid crystal molecules LC of the second viewing angle control sub-pixel can have a second tilt angle, and the second tilt angle is substantially between 70 degrees and 90 degrees (e.g. 85 degrees); under the condition only with horizontal electric field and without perpendicular electric field, the liquid crystal molecules LC of the third viewing angle control sub-pixel can have a third tilt angle, and the third tilt angle is substantially larger than 0 degree and less than or equal to 30 degrees (e.g. 5 degrees). Additionally, under the condition of the liquid crystal molecules LC having the first tilt angle, there's more side light leakage by the viewing angle control sub-pixel VAC; under the condition of the liquid crystal molecules LC having the second tilt angle or the third tilt angle, there's less side light leakage by the viewing angle control sub-pixel VAC. For practical applications, the viewing angle control sub-pixels VAC can be chosen from one, two, or three kinds out of the three viewing angle control sub-pixels described above, which including the first viewing angle control sub-pixel, the second viewing angle control sub-pixel, and the third viewing angle control sub-pixel.

As shown in FIG. 4, under the dark state of the narrow viewing angle display mode, the operating approaches of the color sub-pixels and the viewing angle control sub-pixels VAC are the same as the operating approaches under the dark state of the wide viewing angle display mode, and will not be redundantly described.

Figure 5:
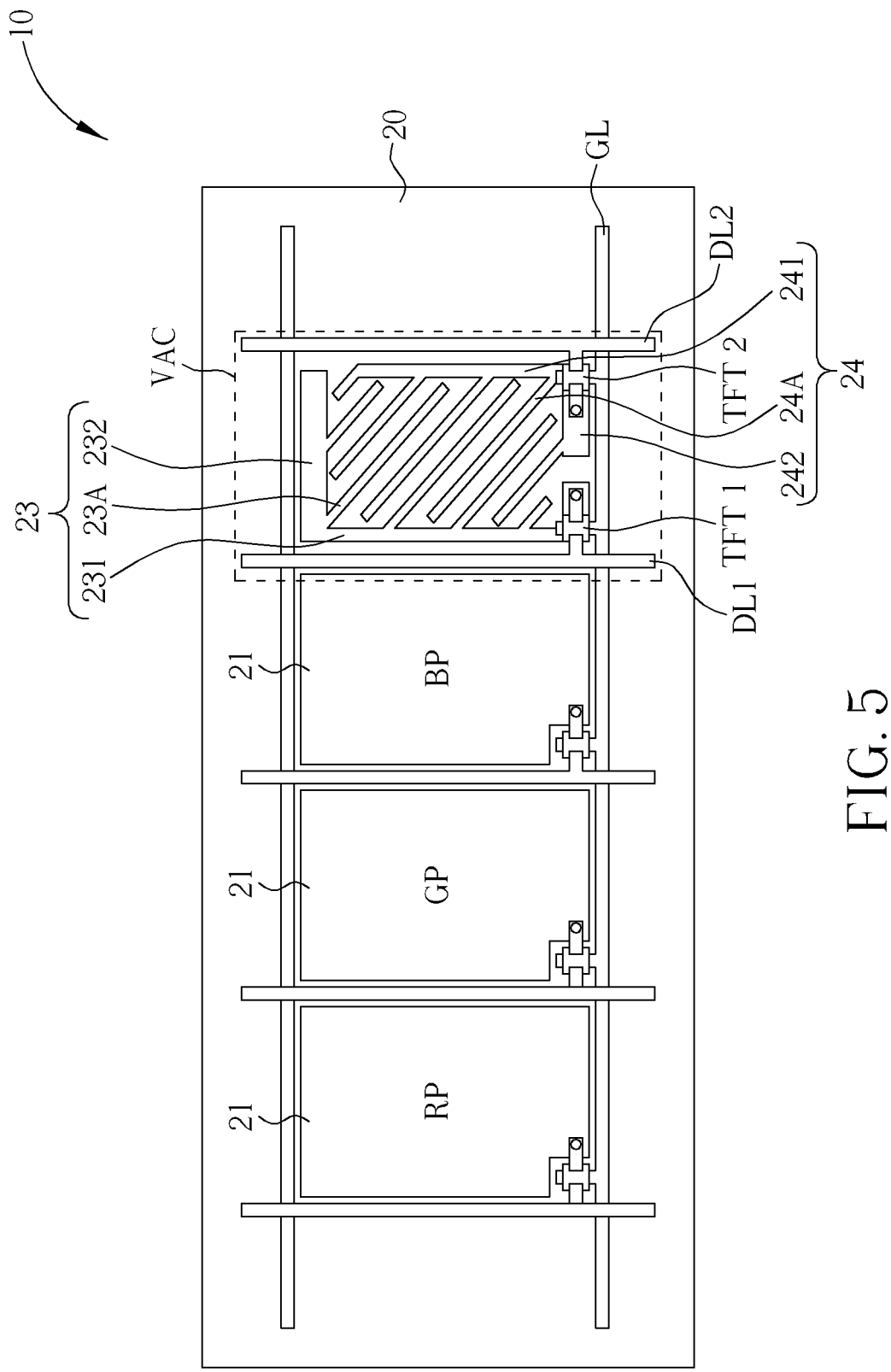
FIG. 5 is a schematic diagram illustrating a top view of the viewing angle switchable liquid crystal display panel according to the embodiment.

Please refer to FIG. 5, and refer to FIGS. 1-4 together. FIG. 5 is a schematic diagram illustrating a top view of the viewing angle switchable liquid crystal display panel according to this embodiment, wherein for clearly showing the electrode pattern design of the viewing angle control sub-pixel VAC, other devices, like the second substrate and the liquid crystal layer, are not illustrated in FIG. 5. As shown in FIG. 5, each of the viewing angle control sub-pixels VAC further comprises a first switch device TFT1 electrically connected to the third electrode 23 to control the third electrode 23, and a second switch device TFT2 electrically connected to the fourth electrode 24 to control the fourth electrode 24. The third electrode 23 and the fourth electrode 24 are electrically disconnected from each other. In this embodiment, the first switch device TFT1 and the second switch device TFT2 share an identical gate line and are electrically connected to two different data lines DL1, DL2. The third electrode 23 comprises a first trunk electrode 231 and a second trunk electrode 232 electrically connected and perpendicular to each other, the fourth electrode 24 comprises a first trunk electrode 241 and a second trunk electrode 242 electrically connected and perpendicular to each other, the first trunk electrode 231 of the third electrode 23 is parallel to the first trunk electrode 241 of the fourth electrode 24, and the second trunk electrode 232 of the third electrode 23 is parallel to the second trunk electrode 242 of the fourth electrode 24. Additionally, the third electrode 23 further comprises a plurality of first stripe electrodes 23A arranged in parallel, and one end of each of the first stripe electrodes 23A of the third electrode 23 is electrically connected to the first trunk electrode 231 or the second trunk electrode 232 of the third electrode 23; the fourth electrode 24 further comprises a plurality of first stripe electrodes 24A arranged in parallel, and one end of each of the first stripe electrodes 24A of the fourth electrode 24 is electrically connected to the first trunk electrode 241 or the second trunk electrode 242 of the fourth electrode 24. Additionally, the first stripe electrodes 23A of the third electrode 23 and the first stripe electrodes 24A of the fourth electrode 24 are parallel or perpendicular to one of the first light transmitting axis P1 and the second light transmitting axis P2.

In the above-mentioned embodiment, the third electrode 23 and the fourth electrode 24 are disposed on the same plane, the third electrode 23 and the fourth electrode 24 do not overlap to each other in a perpendicularly projective direction, and this allocation approach belongs to the in-plane switch (IPS) electrode structure, but the application of the present invention is not limited to this and the allocation approach can be other type of electrode structures, for example, the fringe field switch (FFS) electrode structure. Moreover, the first switch device TFT1 and the second switch device TFT2 of the viewing angle control sub-pixel VAC in the above-mentioned embodiment share an identical gate line and are electrically connected to two different data lines DL1, DL2. In other words, it is the 2D1G structure, but the application of the present invention is not limited to this. The following description will detail the different embodiments of the viewing angle switchable liquid crystal display panel in the present invention, and to simplify the description, the following description will detail the dissimilarities among different embodiments and the identical components will not be redundantly described.

Figure 6:
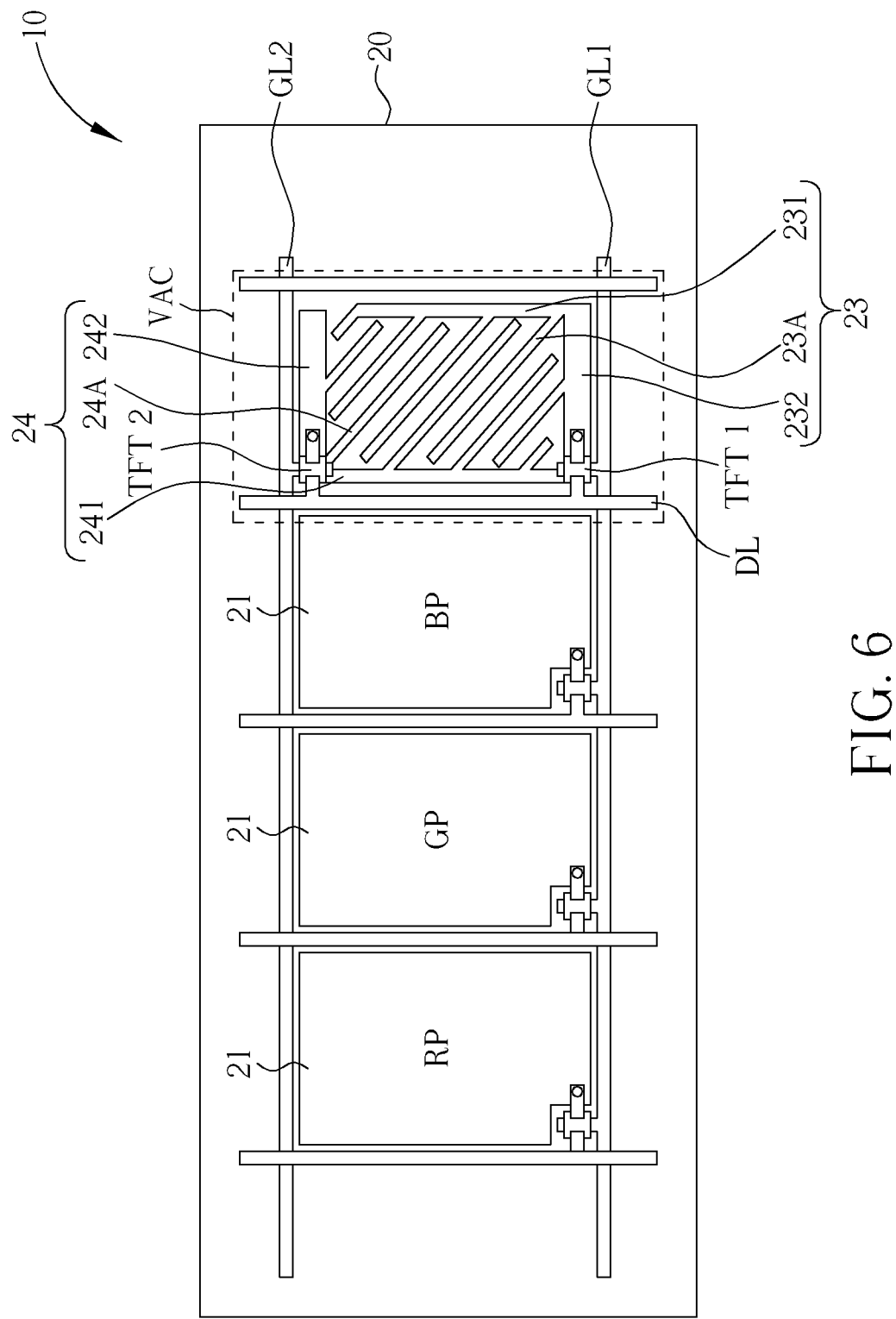
FIG. 6 is a schematic diagram illustrating the viewing angle switchable liquid crystal display panel according to another preferred embodiment of the present invention.

Please refer to FIG. 6. FIG. 6 is a schematic diagram illustrating the viewing angle switchable liquid crystal display panel according to another preferred embodiment of the present invention. As shown in FIG. 6, the difference from the embodiment in FIG. 5 is that the first switch device TFT1 and the second switch device TFT2 of the viewing angle control sub-pixel VAC in this embodiment share an identical data line and are electrically connected to two different gate lines GL1, GL2. In other words, it is the 2G1D structure.

Figure 7:
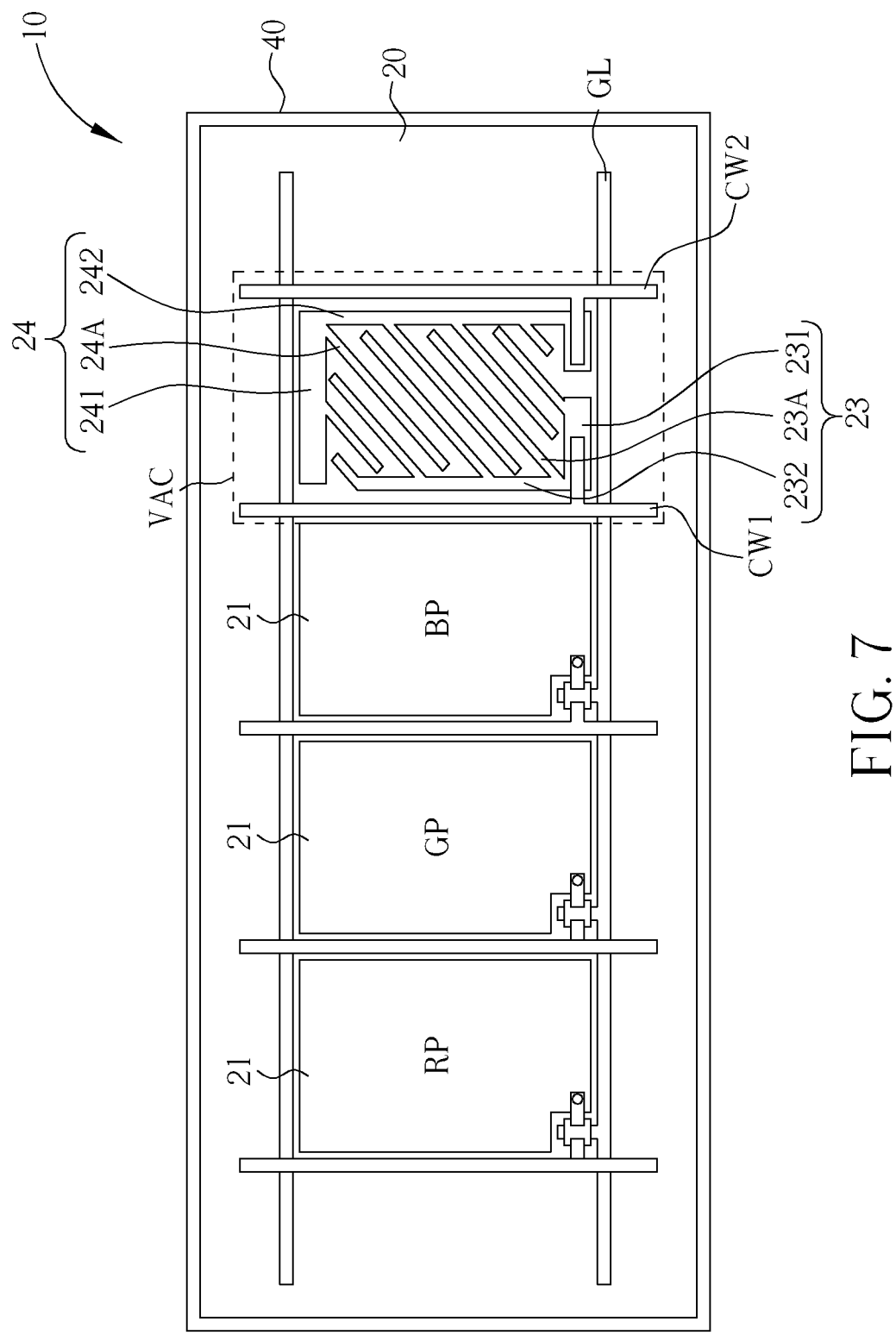
FIG. 7 is a schematic diagram illustrating the viewing angle switchable liquid crystal display panel according to further another preferred embodiment of the present invention.

Please refer to FIG. 7. FIG. 7 is a schematic diagram illustrating the viewing angle switchable liquid crystal display panel according to further another preferred embodiment of the present invention. As shown in FIG. 7, the difference from the embodiments in FIG. 5 and FIG. 6 is that the third electrode 23 and the fourth electrode 24 of the viewing angle control sub-pixel VAC in this embodiment are not controlled by switch devices. The third electrode 23 is electrically connected to a first conductive line CW1 and directly controlled by the voltage signal from the first conductive line CW1, and the fourth electrode 24 is electrically connected to a second conductive line CW2 and directly controlled by the voltage signal from the second conductive line CW2.

In the embodiments of FIG. 5 through FIG. 7, the third electrode 23 comprises only the first stripe electrodes 23A arranged in parallel, the fourth electrode 24 comprises only the first stripe electrodes 24A arranged in parallel, and therefore, under the narrow viewing angle display mode, the viewing angle control sub-pixel VAC will have only the side light leakage in a single direction.

Please refer to FIG. 8A and FIG. 8B, and refer to FIG. 1 through FIG. 4 together. FIG. 8A and FIG. 8B are schematic diagrams illustrating two variation embodiments of the in-plane switch electrode structure in the present invention. As shown in FIG. 8A, the difference from the embodiment in FIG. 5 is that in this embodiment, the third electrode 23 comprises the first trunk electrode 231, a plurality of first stripe electrodes 23A arranged in parallel and a plurality of second strip electrodes 23B arranged in parallel, wherein the first stripe electrode 23A and the second strip electrode 23B are not parallel to each other, one end of each of the first stripe electrodes 23A is electrically connected to the first trunk electrode 231, and one end of each of the second stripe electrodes 23B is electrically connected to another end of the corresponding first stripe electrode 23A. The fourth electrode 24 comprises the first trunk electrode 241, a plurality of first stripe electrodes 24A arranged in parallel and a plurality of second strip electrodes 24B arranged in parallel, wherein the first stripe electrode 24A and the second strip electrode 24B are not parallel to each other, one end of each of the first stripe electrodes 24A is electrically connected to the first trunk electrode 241, and one end of each of the second stripe electrodes 24B is electrically connected to another end of the corresponding first stripe electrode 24A. Additionally, the first stripe electrodes 23A of the third electrode 23 and the second stripe electrode 24B of the fourth electrode 24 are substantially parallel or perpendicular to the first light transmitting axis P1, and the second stripe electrodes 23B of the third electrode 23 and the second stripe electrode 24B of the fourth electrode 24 are substantially parallel or perpendicular to the second light transmitting axis P2.

The electrode structure shown in FIG. 8B is similar to the electrode structure shown in FIG. 8A, and the difference is that a part of the first strip electrodes 23A of the third electrode 23 are orderly and continuingly connected to a part of the second strip electrode 23B of the third electrode 23 to form a zigzag-like structure; following the same rule, a part of the first strip electrodes 24A of the fourth electrode 24 are orderly and continuingly connected to a part of the second strip electrode 24B of the fourth electrode 24 to form a zigzag-like structure. In the embodiments of FIG. 8A and FIG. 8B, the third electrode 23 comprises the first stripe electrode 23A and the second stripe electrode 23B arranged in different directions, the fourth electrode 24 comprises the first stripe electrodes 24A and the second stripe electrode 24B arranged in different directions, and therefore, under the narrow viewing angle display mode, the viewing angle control sub-pixel VAC will have the side light leakage in two different directions.

Figure 9A:
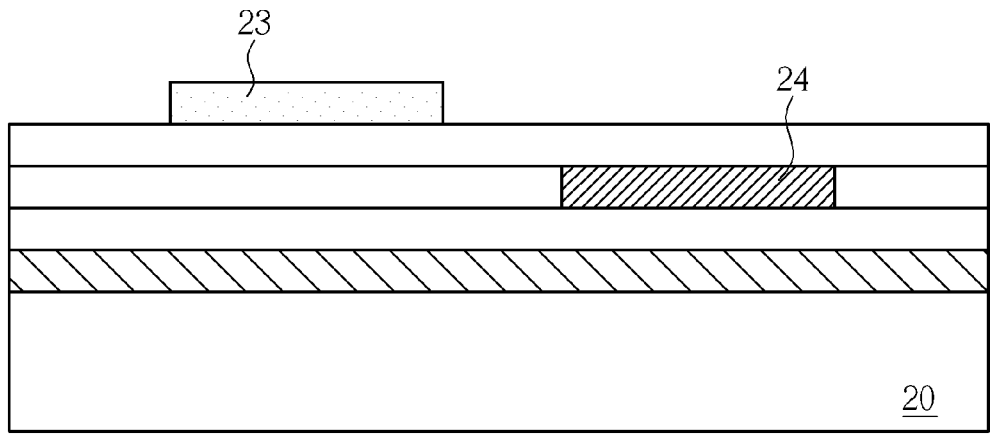
FIGS. 9A-9C are schematic diagrams illustrating three variation embodiments of the in-plane switch electrode structure in the present invention.
Figure 9B:
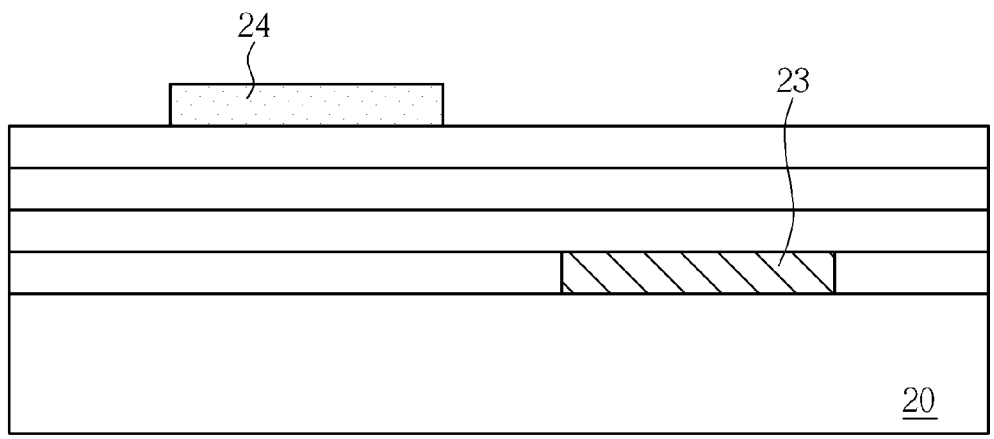
Figure 9C:
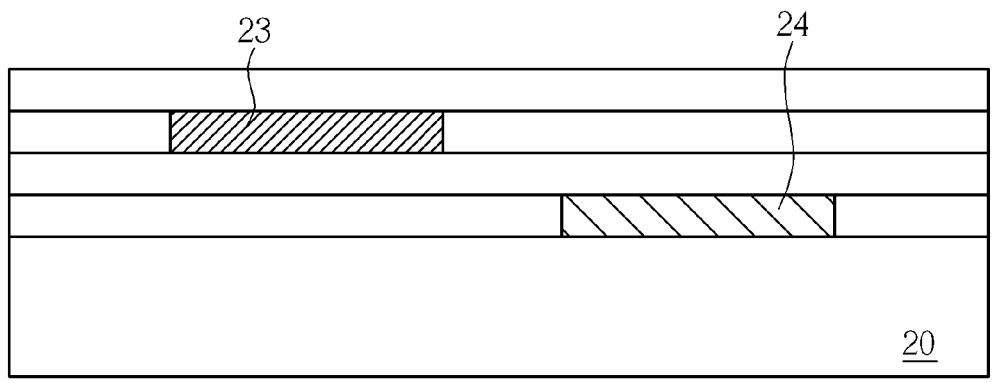

In each of the above-mentioned embodiments, the third electrode 23 and the fourth electrode 24 are disposed on an identical plane, but the present invention is not limited to this. Please further refer to FIG. 9A through FIG. 9C. FIG. 9A through FIG. 9C are schematic diagrams illustrating three variation embodiments of the in-plane switch electrode structure in the present invention, and these embodiments can be applied to any one of the in-plane switch electrode structures disclosed in FIG. 1 through FIG. 8B. In the embodiment shown in FIG. 9A through FIG. 9C, the third electrode 23 and the fourth electrode 24 are disposed on different planes, but the third electrode 23 and the fourth electrode 24 do not overlap to each other in a perpendicularly projective direction, and therefore the horizontal electric field still can exist by controlling the voltage between the third electrode 23 and the fourth electrode 24. As shown in FIG. 9A, the third electrode 23 is a transparent electrode which can be made of an identical transparent conductive layer with the first electrode (not shown), and the fourth electrode 24 is a non-transparent electrode which can be made of an identical non-transparent conductive layer (the second metal layer) with the data lines (not shown). As shown in FIG. 9B, the fourth electrode 24 is a transparent electrode and the third electrode 23 is a non-transparent electrode which can be selectively made of an identical non-transparent conductive layer (the first metal layer) with the gate lines (not shown). As shown in FIG. 9C, the third electrode 23 is a non-transparent electrode which can be selectively made of an identical non-transparent conductive layer (the second metal layer) with data lines (not shown), and the fourth electrode 24 is a non-transparent electrode which can be selectively made of an identical non-transparent conductive layer (the first metal layer) with the first electrode (not shown), but the present invention is not limited to this. Depends on different process design, there can be different embodiments. For example, the fourth electrode 24 is a non-transparent electrode and the third electrode 23 is also a non-transparent electrode, and furthermore, the materials and the process steps can also be completed selectively at the same time as other process steps or not.

Figure 10:
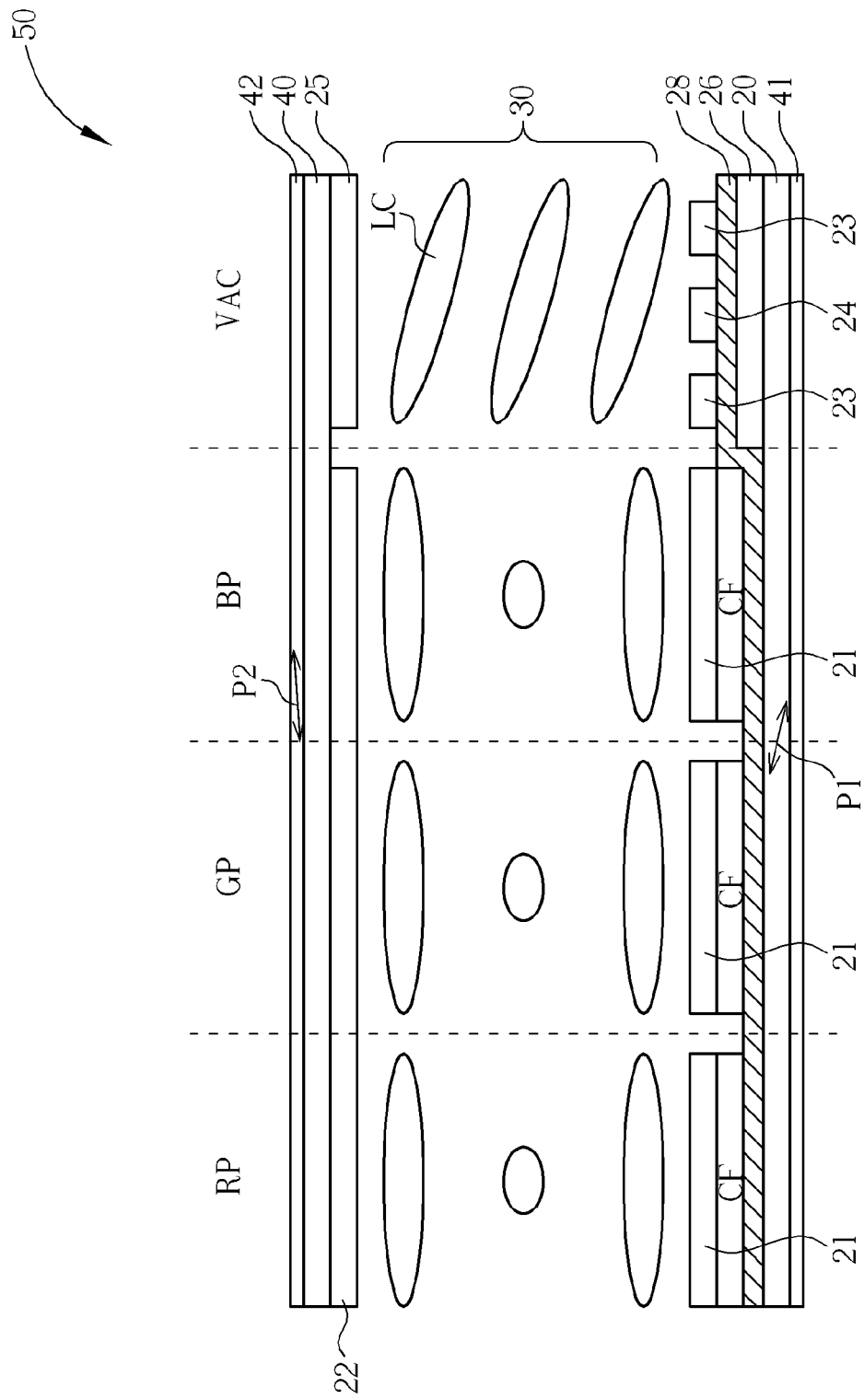
FIG. 10 is a schematic diagram illustrating the viewing angle switchable liquid crystal display panel according to further another preferred embodiment of the present invention.

Please refer to FIG. 10. FIG. 10 is a schematic diagram illustrating the viewing angle switchable liquid crystal display panel according to further another preferred embodiment of the present invention. The difference from the above-mentioned embodiments is that the viewing angle switchable liquid crystal display panel in this embodiment comprises the fringe field switch electrode structure. As shown in FIG. 10, the viewing angle control sub-pixel VAC of viewing angle switchable liquid crystal display panel 50 in this embodiment further comprises a sixth electrode 26 disposed on the inner side of the first substrate 20 facing the second substrate 40, and a insulating layer 28 disposed between the third electrode 23 and the sixth electrode 26 and between the fourth electrode 24 and the sixth electrode 26. The third electrode 23 of each of the viewing angle control sub-pixels VAC is electrically connected to the fourth electrode 24 of each of the viewing angle control sub-pixels VAC, and the sixth electrode 26 is disposed on a plane different to the plane of the third electrode 23 and the fourth electrode 24. For example, the sixth electrode 26 is disposed under the third electrode 23 and the fourth electrode 24. Additionally, the sixth electrode 26 is electrically disconnected from the third electrode 23 and the fourth electrode 24, and the sixth electrode 26 is a planar electrode. Furthermore, the viewing angle switchable liquid crystal display panel 50 can further comprise color filter (CF) layer disposed on the first substrate 20 or the second substrate 40. For example, in this embodiment, the color filter layer CF is disposed on the inner side of the first substrate 20, and this is an approach called color filter on array (COA). Additionally, the second electrode 22 and the fifth electrode 25 can be electrically connected to each other and be controlled by an identical voltage signal, such as a common signal, or be electrically disconnected from each other and be controlled by different voltage signals. For example, in this embodiment, the second electrode 22 and the fifth electrode 25 are controlled by the different voltage signals.

The operating approach of the color sub-pixel of the viewing angle switchable liquid crystal display panel in this embodiment is identical to the operating approaches in the above-mentioned embodiments and will not be redundantly described. The following description will only detail the operating approach of the viewing angle control sub-pixel VAC. Under the bright state of the wide viewing angle display mode, no horizontal electric field exists in the viewing angle control sub-pixel VAC when not applying voltage to the third electrode 23, the fourth electrode 24, and the sixth electrode 26, or applying an identical voltage to the third electrode 23, the fourth electrode 24, and the sixth electrode 26; additionally, no perpendicular electric field exists in the viewing angle control sub-pixel VAC when not applying voltage to the fifth electrode 25, or applying a voltage, which is identical to the voltage of the third electrode 23, the fourth electrode 24, and the sixth electrode 26, to the fifth electrode 25. Under the dark state of the wide viewing angle display mode and the dark state of the narrow viewing angle display mode, there are two operating approaches listed below. The first approach is applying no voltage to the third electrode 23, the fourth electrode 24 and the sixth electrode 26 or applying an identical voltage to the third electrode 23, the fourth electrode 24 and the sixth electrode 26 to form no horizontal electric field in the viewing angle control sub-pixels VAC, and applying a voltage, which is different from the voltage applied to the third electrode 23, the fourth electrode 24 and the sixth electrode 26, to the fifth electrode 25 to form a perpendicular electric field in the viewing angle control sub-pixels VAC. Based on the existence of the perpendicular electric field, the dark state can be achieved by the liquid crystal molecules LC of the viewing angle control sub-pixels VAC standing and aligned perpendicularly and keeping the backlight from passing through the viewing angle control sub-pixel VAC. The second approach is applying different voltages to the third electrode 23, the fourth electrode 24 and the sixth electrode 26 or applying a voltage to one of the third electrode 23, the fourth electrode 24 and the sixth electrode 26 to form a horizontal electric field; meanwhile, the second approach is applying a voltage, which is identical with the voltage applied to one of the third electrode 23, the fourth electrode 24, and the sixth electrode 26, to the fifth electrode 25 as much as possible to maintain no perpendicular electric field or a minor perpendicular electric field existing between the fifth electrode 25 and the third electrode 23, between the fifth electrode 25 and the fourth electrode 24, and between the fifth electrode 25 and the sixth electrode 26. Based on the second operating approach, it can keep the viewing angle control sub-pixels VAC from providing luminance. One or both of the above-mentioned first operating approach and the above-mentioned second operating approach of the viewing angle control sub-pixels VAC can be utilized, and in other words, a part of the viewing angle control sub-pixels VAC can adopt the first operating approach and another part of the viewing angle control sub-pixels VAC can adopt the second operating approach. Under the bright state of the narrow viewing angle display mode, when there are different voltages applied to the third electrode 23, the fourth electrode 24, and the sixth electrode 26 or there's a voltage applied to one of the third electrode 23, the fourth electrode 24, and the sixth electrode 26, a horizontal electric field exists between the third electrode 23 and the fourth electrode 24, and the horizontal electric field can drive the liquid crystal molecules LC aligned in parallel and parallel or perpendicular to one of the transmitting axis directions of the first light transmitting axis P1 and the second light transmitting axis P2; meanwhile, when there's a voltage, which is different from the voltage applied on the third electrode 23, the fourth electrode 24, or the sixth electrode 26, applied on the fifth electrode 25, a perpendicular electric field exists between the fifth electrode 25 and the third electrode 23, between the fifth electrode 25 and the fourth electrode 24, or between the fifth electrode 25 and the sixth electrode 26, and this perpendicular electric field can drive the liquid crystal molecules LC aligned in the perpendicular direction with a tilt angle. The side light leakage can be occurred by the viewing angle control sub-pixels VAC with the tilt angle of the liquid crystal molecules LC under the perpendicular electric field, and under this condition, the viewing angle control sub-pixels VAC will not make a contribution to the luminance in the front viewing direction and have interference effect by the light leakage in the side viewing direction. For practical applications, the viewing angle control sub-pixels VAC can be disposed on any sites of the first substrate 20, and the number of the viewing angle control sub-pixels VAC can be adjusted as needed and do not need to correspond to the number of the color sub-pixels. Furthermore, the level of the perpendicular electric field and the level of the horizontal electric field can be changed by tuning the voltages of the third electrode 23, the fourth electrode 24, the fifth electrode 25, and the sixth electrode 26, and the tilt angle of the liquid crystal molecules LC can be further changed to control the side light leakage. The effect on the tilt angle of the liquid crystal molecule by the perpendicular electric field and the horizontal electric field is identical to the above-mentioned description, and will not be redundantly described.

Figure 11:
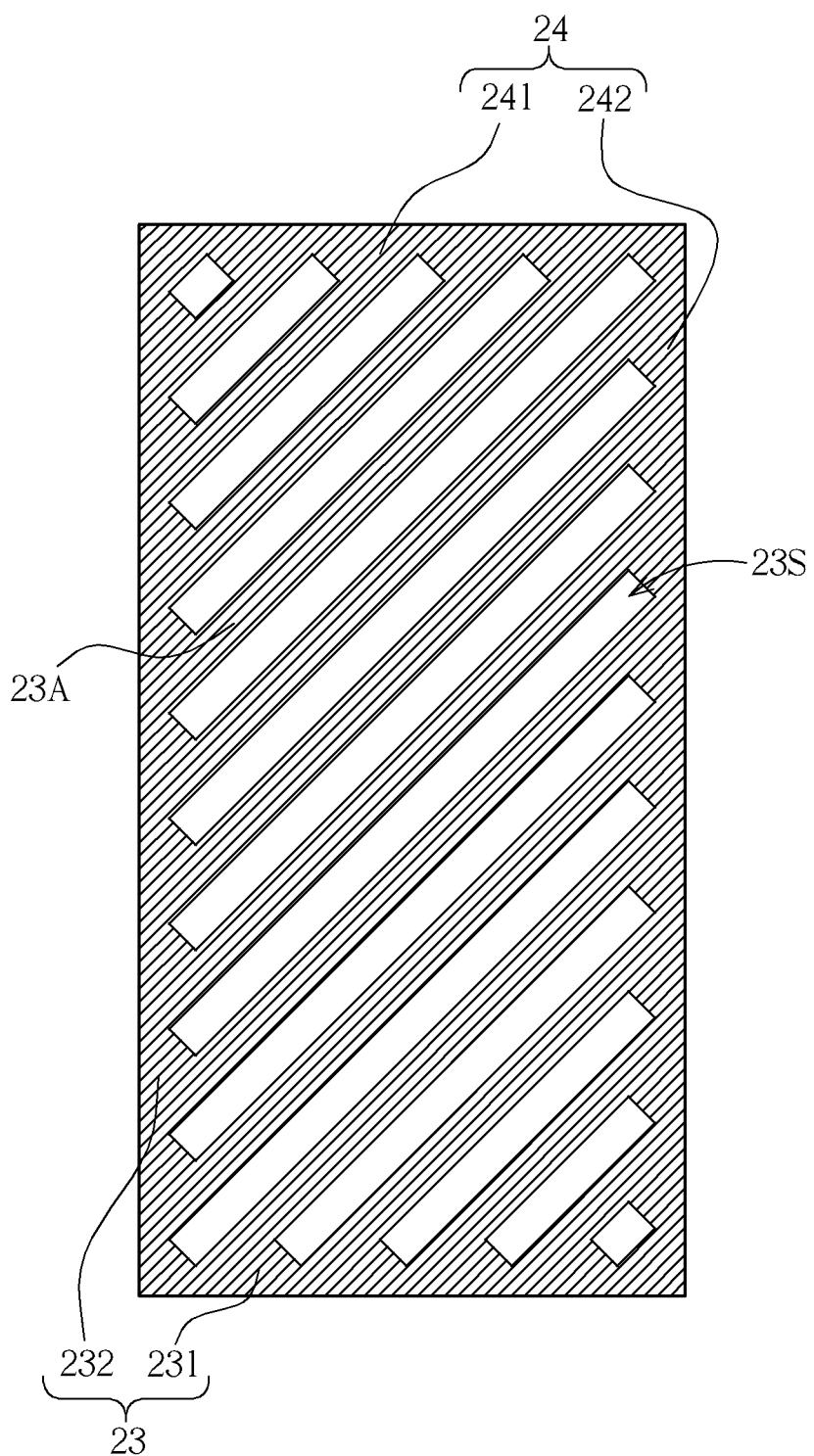
FIG. 11 is a schematic diagram illustrating a top view of an embodiment of the third electrode and the fourth electrode in FIG. 10.

Please refer to FIG. 11, and refer to FIG. 10 together. FIG. 11 is a schematic diagram illustrating a top view of an embodiment of the third electrode and the fourth electrode in FIG. 10. As shown in FIG. 11, the third electrode 23 of each of the viewing angle control sub-pixels VAC comprises the first trunk electrode 231 and the second trunk electrode 232 electrically connected and perpendicular to each other, and the fourth electrode 24 of each of the viewing angle control sub-pixels VAC comprises the first trunk electrode 241 and the second trunk electrode 242 electrically connected and perpendicular to each other. The first trunk electrode 231 and the second trunk electrode 232 of the third electrode 23 and the first trunk electrode 241 and the second trunk electrode 242 of the fourth electrode 24 are connected to each other and form a hollow square frame. Besides, the third electrode 23 and the fourth electrode 24 further comprise a plurality of first stripe electrodes 23A arranged in parallel, one end of each of the first stripe electrodes 23A is electrically connected to the first trunk electrode 231 or the second trunk electrode 232 of the third electrode 23, the other end of each of the first stripe electrodes 23A is electrically connected to the first trunk electrode 241 or the second trunk electrode 242 of the fourth electrode 24, and there is a slit 23S between the two adjacent first stripe electrodes 23A. Additionally, the first stripe electrodes 23A are substantially parallel or perpendicular to one of the first light transmitting axis P1 and the second light transmitting axis P2.

Figure 12:
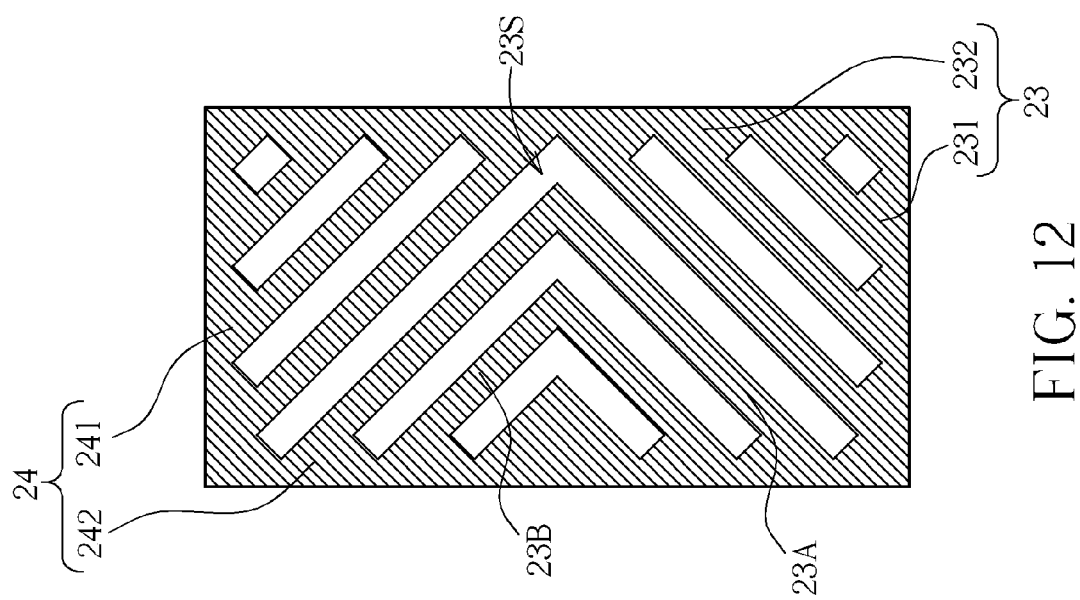
FIG. 12 is a schematic diagram illustrating a top view of another embodiment of the third electrode and the fourth electrode in FIG. 10.

Please further refer to FIG. 12, and refer to FIG. 10 together. FIG. 12 is a schematic diagram illustrating a top view of another embodiment of the third electrode and the fourth electrode in FIG. 10. As shown in FIG. 12, comparing to the embodiment in FIG. 11, the third electrode 23 and the fourth electrode 24 in this embodiment further comprise a plurality of second stripe electrode 23B arranged in parallel. The first stripe electrodes 23A and the second stripe electrodes 23B are not parallel to each other, one end of each of the first stripe electrodes 23A is electrically connected to the first trunk electrode 231 or the second trunk electrode 232 of the third electrode 23, the other end of each of the first stripe electrodes 23A is electrically connected to one end of the corresponding second stripe electrode 23B, the other end of each of the second stripe electrodes 23B is electrically connected to the first trunk electrode 241 or the second trunk electrode 242 of the fourth electrode 24, and there a slit 23S between the first stripe electrode 23A and the second stripe electrode 23B adjacent to each other. Additionally, the first stripe electrodes 23A are substantially parallel or perpendicular to the first light transmitting axis P1, and the second stripe electrodes 23B are substantially parallel or perpendicular to the second light transmitting axis P2.

Figure 13:
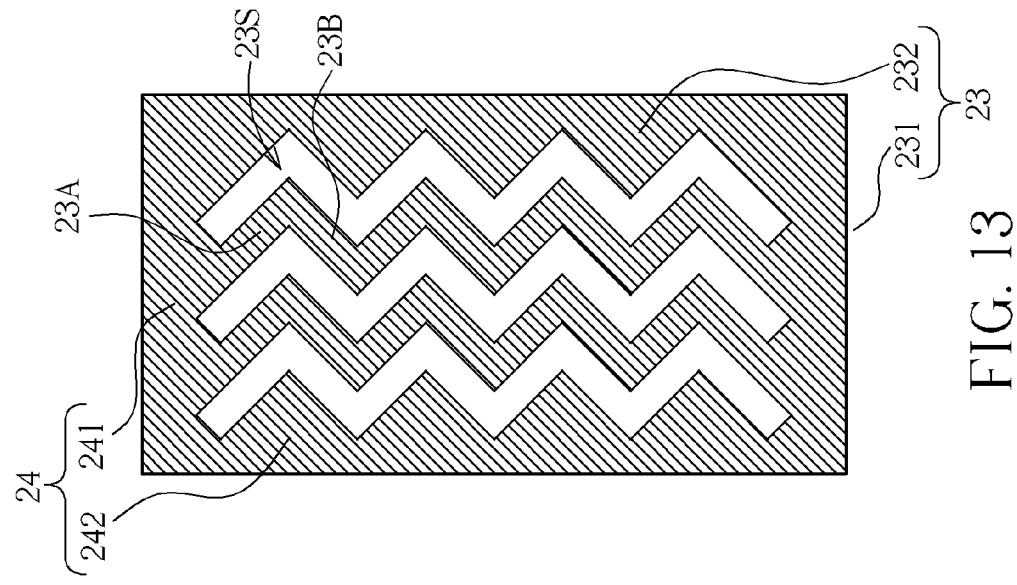
FIG. 13 is a schematic diagram illustrating a top view of further another embodiment of the third electrode and the fourth electrode in FIG. 10.

Please further refer to FIG. 13, and refer to FIG. 10 together. FIG. 13 is a schematic diagram illustrating a top view of further another embodiment of the third electrode and the fourth electrode in FIG. 10. As shown in FIG. 13, the electrode structure in FIG. 13 is similar to the electrode structure in FIG. 12, the difference is that a part of the first strip electrodes 23A of the third electrode 23 are orderly and continuingly connected to a part of the second strip electrode 23B of the third electrode 23 to form a zigzag-like structure; following the same rule, a part of the first strip electrodes 24A of the fourth electrode 24 are orderly and continuingly connected to a part of the second strip electrode 24B of the fourth electrode 24 to form a zigzag-like structure.

In the embodiment of FIG. 11, the third electrode 23 and the fourth electrode 24 comprise only the first stripe electrodes 23A arranged in parallel, and therefore, under the narrow viewing angle display mode, the viewing angle control sub-pixel VAC will have only the side light leakage in a single direction. In the embodiments of FIG. 12 and FIG. 13, the third electrode 23 and the fourth electrode 24 comprise the first stripe electrodes 23A and the second stripe electrode 23B arranged in different directions, and therefore, under the narrow viewing angle display mode, the viewing angle control sub-pixel VAC will have the side light leakage in two different directions.

Figure 15:
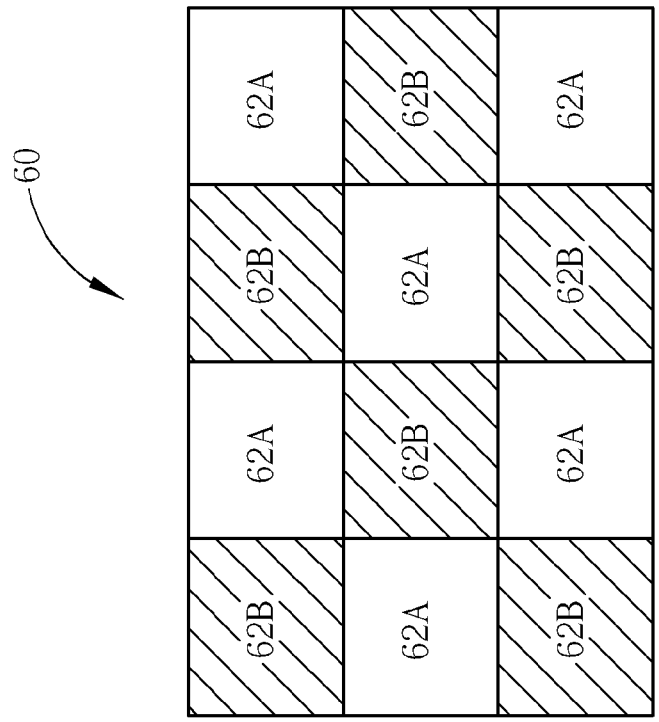
FIG. 15 is a schematic diagram illustrating the side viewing condition of the viewing angle switchable liquid crystal display panel under the narrow viewing angle display mode according to the present embodiment.
Figure 14:
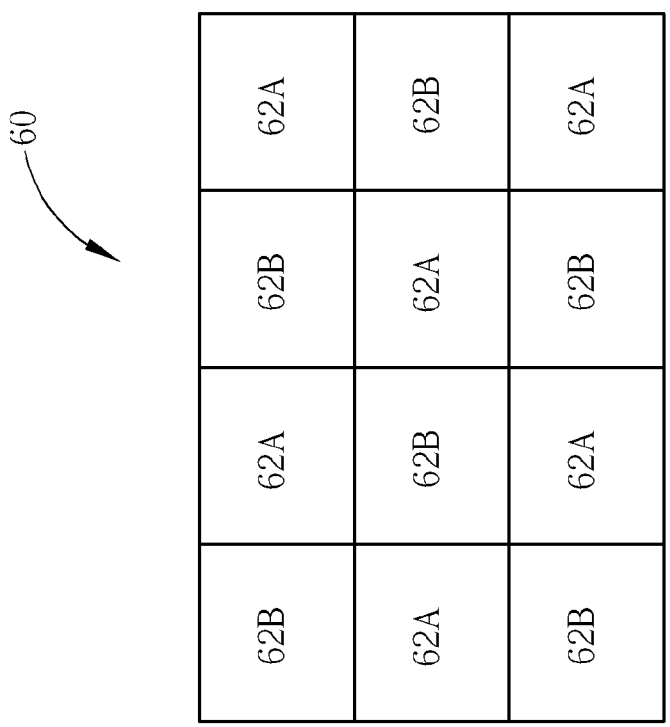
FIG. 14 is a schematic diagram illustrating the front viewing or the side viewing conditions of the viewing angle switchable liquid crystal display panel under the wide viewing angle display mode according to a preferred embodiment of the present invention.

Please further refer to FIG. 14 and FIG. 15. FIG. 14 is a schematic diagram illustrating the front viewing or the side viewing conditions of the viewing angle switchable liquid crystal display panel under the wide viewing angle display mode according to a preferred embodiment of the present invention, and FIG. 15 is a schematic diagram illustrating the side viewing condition of the viewing angle switchable liquid crystal display panel under the narrow viewing angle display mode according to the present embodiment. The viewing angle switchable liquid crystal display panel 60 of this embodiment can be divided into a plurality of first domains 62A and a plurality of second domains 62B. The first domains 62A and the second domains 62B can be aligned in a matrix mode, but the present invention is not limited to this. In a first selected embodiment, there are viewing angle control sub-pixels disposed in each one of the first domains 62A and each one of the second domains 62B, and the viewing angle control sub-pixels with the side light leakage in a single direction can be selected as all of the viewing angle control sub-pixels. As shown in FIG. 14, under the wide viewing angle display mode, all of the viewing angle control sub-pixels can make a contribution to luminance in the front viewing direction and in the side viewing direction; and as shown in FIG. 15, under the narrow viewing angle display mode, by controlling the voltage, such as the viewing angle control sub-pixels in the first domains 62A can be controlled under the on stage, and such as the viewing angle control sub-pixels in the second domain 62B can be controlled under the off stage. Under this condition, the viewing angle control sub-pixels in the first domains 62A can provide the side light leakage in a single direction, the viewing angle control sub-pixels in the second domains 62B can not provide the side light leakage, and the narrow viewing angle display effect can be achieved by interfering with the side viewers. In a second selected embodiment, there are viewing angle control sub-pixels disposed in each one of the first domains 62A and each one of the second domains 62B, and the viewing angle control sub-pixels with the side light leakage in two different directions can be selected as all of the viewing angle control sub-pixels. As shown in FIG. 15 and following the same rule, under the narrow viewing angle display mode, by controlling the voltage, such as the viewing angle control sub-pixels in the first domains 62A can be controlled under the on stage, and such as the viewing angle control sub-pixels in the second domains 62B can be controlled under the off stage. Under this condition, the viewing angle control sub-pixels in the first domains 62A can provide the side light leakage in two different directions, the viewing angle control sub-pixels in the second domains 62B can not provide the side light leakage, and the narrow viewing angle display effect can be achieved by the interference occurred to the side viewers. In a third selected embodiment, there are viewing angle control sub-pixels disposed in both any one of the first domains 62A and any one of the second domains 62B, and the viewing angle control sub-pixels disposed in the first domains 62A have the side light leakage in different directions from the side light leakage of the viewing angle control sub-pixels disposed in the second domains 62B. Under the narrow viewing angle display mode, the viewing angle control sub-pixels in the first domains 62A and the second domains 62B can be controlled within the on stage by the voltage control, and the narrow viewing angle display effect can be achieved by interfering with the side viewers due to the side light leakage in different directions made by the viewing angle control sub-pixels disposed in the first domains 62A and the second domains 62B. In a fourth selected embodiment, there are viewing angle control sub-pixels disposed in each one of the first domains 62A and each one of the second domains 62B, and each of the viewing angle control sub-pixels can be selected from one of the viewing angle control sub-pixels with the side light leakage in a single direction or the viewing angle control sub-pixels with the side light leakage in different directions. Under the narrow viewing angle display mode, the viewing angle control sub-pixels in the first domains 62A and the second domains 62B can be controlled under the on stage by the voltage control, and the narrow viewing angle display effect also can be achieved by the decrease of the side contrast ratio due to the side light leakage made by both the viewing angle control sub-pixels disposed in the first domains 62A and the second domains 62B. In a fifth selected embodiment, there can be viewing angle control sub-pixels disposed only in the first domains 62A and not in the second domains 62B, and the viewing angle control sub-pixels in the second domains 62B can be only design as white sub-pixels. Under the narrow viewing angle display mode, such as the viewing angle control sub-pixels in the first domains 62A can be controlled under the on stage by the voltage control, and such as the white sub-pixels in the second domains 62B can be controlled under the off stage by the voltage control. Under this condition, the viewing angle control sub-pixels in the first domains 62A will provide the side light leakage, the white sub-pixels in the second domains 62B will not provide the side light leakage, and the narrow viewing angle display effect can be achieved by interfering with the side viewers.

To summarize all the descriptions above, the viewing angle switchable liquid crystal display panel in the present invention comprises viewing angle control sub-pixels, wherein under the wide viewing angle display mode, the viewing angle control sub-pixels can make a contribution to the luminance, and under the narrow viewing angle display mode, the viewing angle control sub-pixels provide side light leakage for interfering side viewers to achieve the anti-peeking effect.

Those skilled in the art will readily observe that numerous modifications and alterations of the device and method may be made while retaining the teachings of the invention.

What is claimed is:

1. A viewing angle switchable liquid crystal display panel, comprising:
   a first substrate;
   a second substrate, disposed oppositely to the first substrate;
   a liquid crystal layer, comprising a plurality of liquid crystal molecules and disposed between the first substrate and the second substrate;
   a plurality of color sub-pixels, wherein the liquid crystal molecules of each of the color sub-pixels include twisted nematic liquid crystal molecules, and each of the color sub-pixels comprises:
      a first electrode, disposed on an inner side of the first substrate facing the second substrate; and
      a second electrode, disposed on an inner side of the second substrate facing the first substrate; and
   a plurality of viewing angle control sub-pixels, wherein each of the view angle control sub-pixels comprises:
      a third electrode, disposed on the inner side of the first substrate facing the second substrate;
      a fourth electrode, disposed on the inner side of the first substrate facing the second substrate; and
      a fifth electrode, disposed on the inner side of the second substrate facing the first substrate,
   wherein under a narrow viewing angle display mode, the viewing angle control sub-pixels comprise at least a first viewing angle control sub-pixel, a horizontal electric field exists between the third electrode and the fourth electrode of the first viewing angle control sub-pixel, a perpendicular electric field exists between the fifth electrode and at least one of the third electrode and the fourth electrode of the first viewing angle control sub-pixel, and the liquid crystal molecules of the first viewing angle control sub-pixel have a first tilt angle in a perpendicular direction.

2. The viewing angle switchable liquid crystal display panel of claim 1, wherein the first tilt angle is substantially between 30 degrees and 70 degrees.

3. The viewing angle switchable liquid crystal display panel of claim 2, wherein the first tilt angle is substantially 45 degrees.

4. The viewing angle switchable liquid crystal display panel of claim 1, wherein under the narrow viewing angle display mode, the viewing angle control sub-pixels comprise at least a second viewing angle control pixel, a perpendicular electric field exists between the fifth electrode and at least one of the third electrode and the fourth electrode of the second viewing angle control sub-pixel, and the liquid crystal molecules of the second viewing angle control sub-pixel have a second tilt angle different from the first tilt angle in the perpendicular direction.

5. The viewing angle switchable liquid crystal display panel of claim 4, wherein the second tilt angle is substantially between 70 degrees and 90 degrees.

6. The viewing angle switchable liquid crystal display panel of claim 5, wherein the second tilt angle is substantially 85 degrees.

7. The viewing angle switchable liquid crystal display panel of claim 1, wherein under the narrow viewing angle display mode, the viewing angle control sub-pixels comprise at least a third viewing angle control sub-pixel, a horizontal electric field exists between the third electrode and the fourth electrode of the third viewing angle control sub-pixel, and the liquid crystal molecules of the third viewing angle control sub-pixel have a third tilt angle different from the first tilt angle in the perpendicular direction.

8. The viewing angle switchable liquid crystal display panel of claim 7, wherein the third tilt angle is substantially larger than 0 degree and less than or equal to 30 degrees.

9. The viewing angle switchable liquid crystal display panel of claim 8, wherein the third tilt angle is substantially 5 degrees.

10. The viewing angle switchable liquid crystal display panel of claim 1, wherein under a wide viewing angle and bright state display mode, the liquid crystal molecules of the viewing angle control sub-pixels are substantially aligned in a twisted nematic mode.

11. The viewing angle switchable liquid crystal display panel of claim 10, wherein under the wide viewing angle and bright state display mode, the viewing angle control sub-pixel comprises a white sub-pixel, a transparent sub-pixel or a color sub-pixel.

12. The viewing angle switchable liquid crystal display panel of claim 1, wherein under a wide viewing angle and dark state display mode, the liquid crystal molecules of the viewing angle control sub-pixels are aligned in a vertical alignment mode.

13. The viewing angle switchable liquid crystal display panel of claim 1, wherein each of the color sub-pixels comprises a red sub-pixel, a green sub-pixel or a blue sub-pixel.

14. The viewing angle switchable liquid crystal display panel of claim 1, wherein each of the viewing angle control sub-pixels further comprises a first switch device to control the third electrode, and a second switch device to control the fourth electrode.

15. The viewing angle switchable liquid crystal display panel of claim 14, wherein the first switch device and the second switch device share one gate line and are electrically connected to two different data lines.

16. The viewing angle switchable liquid crystal display panel of claim 14, wherein the first switch device and the second switch device share one data line and are electrically connected to two different gate lines.

17. The viewing angle switchable liquid crystal display panel of claim 1, further comprising a first conductive line and a second conductive line disposed on the first substrate, wherein the third electrode of each of the viewing angle control sub-pixels is electrically connected to the first conductive line, and the fourth electrode of each of the viewing angle control sub-pixels is electrically connected to the second conductive lines.

18. The viewing angle switchable liquid crystal display panel of claim 1, further comprising a color filter layer disposed on the first substrate or the second substrate.

19. The viewing angle switchable liquid crystal display panel of claim 1, further comprising a first polarizing film and a second polarizing film disposed to an outer side of the first substrate and an outer side of the second substrate, respectively, wherein the first polarizing film has a first light transmitting axis and the second polarizing film has a second light transmitting axis, and the first light transmitting axis and the second light transmitting axis are substantially perpendicular to each other.

20. The viewing angle switchable liquid crystal display panel of claim 19, wherein the third electrode and the fourth electrode of each of the viewing angle control sub-pixels do not overlap to each other in a perpendicularly projective direction.

21. The viewing angle switchable liquid crystal display panel of claim 19, wherein the third electrode of each of the viewing angle control sub-pixels further comprises a first trunk electrode and a second trunk electrode electrically connected and perpendicular to each other, the fourth electrode of each of the viewing angle control sub-pixels further comprises a first trunk electrode and a second trunk electrode electrically connected and perpendicular to each other, the first trunk electrode of the third electrode is parallel to the first trunk electrode of the fourth electrode, and the second trunk electrode of the third electrode is parallel to the second trunk electrode of the fourth electrode.

22. The viewing angle switchable liquid crystal display panel of claim 21, wherein the third electrode of each of the viewing angle control sub-pixels further comprises a plurality of first stripe electrodes arranged in parallel, one end of each of the first stripe electrodes of the third electrode is electrically connected to the first trunk electrode or the second trunk electrode of the third electrode, the fourth electrode of each of the viewing angle control sub-pixels further comprises a plurality of first stripe electrodes arranged in parallel, and one end of each of the first stripe electrodes of the fourth electrode is electrically connected to the first trunk electrode or the second trunk electrode of the fourth electrode.

23. The viewing angle switchable liquid crystal display panel of claim 22, wherein the first stripe electrodes of the third electrode and the first stripe electrodes of the fourth electrode of each of the viewing angle control sub-pixels are substantially parallel to one of the first light transmitting axis and the second light transmitting axis.

24. The viewing angle switchable liquid crystal display panel of claim 22, wherein the third electrode of each of the viewing angle control sub-pixels further comprises a plurality of second stripe electrodes arranged in parallel, the second stripe electrodes of the third electrode are respectively and electrically connected to the corresponding first stripe electrodes of the third electrode, the fourth electrode of each of the viewing angle control sub-pixels further comprises a plurality of second stripe electrodes arranged in parallel, the second stripe electrodes of the fourth electrode are respectively and electrically connected to the corresponding first stripe electrodes of the fourth electrode, the first stripe electrodes of the third electrode and the second stripe electrodes of the fourth electrode are substantially parallel or perpendicular to the first light transmitting axis, and the second stripe electrodes of the third electrode and the first stripe electrodes of the fourth electrode are substantially parallel or perpendicular to the second light transmitting axis.

25. The viewing angle switchable liquid crystal display panel of claim 20, wherein the third electrode and the fourth electrode of each of the viewing angle control sub-pixels are electrically disconnected.

26. The viewing angle switchable liquid crystal display panel of claim 20, wherein the third electrode and the fourth electrode of each of the viewing angle control sub-pixels are disposed on the same plane, and the third electrode and the fourth electrode are transparent electrodes.

27. The viewing angle switchable liquid crystal display panel of claim 20, further comprising an insulating layer disposed between the third electrode and the fourth electrode of each of the viewing angle control sub-pixels, the third electrode and the fourth electrode being disposed on different planes, wherein the third electrode comprises a transparent electrode or a non-transparent electrode, and the fourth electrode comprises a transparent electrode or an non-transparent electrode.

28. The viewing angle switchable liquid crystal display panel of claim 19, wherein each of the viewing angle control sub-pixels further comprises a sixth electrode disposed on the inner side of the first substrate facing the second substrate and an insulating layer disposed between the third electrode and the six electrode and between the fourth electrode and the sixth electrode, the third electrode of each of the viewing angle control sub-pixels is electrically connected to the fourth electrode, the sixth electrode is disposed on a different plane from the third electrode and the fourth electrode, and the sixth electrode is electrically disconnected from the third electrode and the fourth electrode.

29. The viewing angle switchable liquid crystal display panel of claim 28, wherein the sixth electrode of each of the viewing angle control sub-pixels is a planar electrode.

30. The viewing angle switchable liquid crystal display panel of claim 29, wherein the third electrode of each of the viewing angle control sub-pixels further comprises a first trunk electrode and a second trunk electrode electrically connected and perpendicular to each other, the fourth electrode of each of the viewing-angle control sub-pixels further comprises a first trunk electrode and a second trunk electrode electrically connected and perpendicular to each other, and the first trunk electrode and the second trunk electrode of the third electrode and the first trunk electrode and the second trunk electrode of the fourth electrode are connected to each other and form a hollow square frame.

31. The viewing angle switchable liquid crystal display panel of claim 30, wherein the third electrode and the fourth electrode further comprise a plurality of first stripe electrodes arranged in parallel, one end of each of the first stripe electrodes is electrically connected to the first trunk electrode or the second trunk electrode of the third electrode, the other end of each of the first stripe electrodes is electrically connected to the first trunk electrode or the second trunk electrode of the fourth electrode, and there is a slit between the two adjacent first stripe electrodes.

32. The viewing angle switchable liquid crystal display panel of claim 31, wherein the first stripe electrodes are substantially parallel to one of the first light transmitting axis and the second light transmitting axis.

33. The viewing angle switchable liquid crystal display panel of claim 30, wherein the third electrodes and the fourth electrodes further comprise a plurality of first stripe electrodes arranged in parallel and a plurality of second stripe electrodes arranged in parallel, the first stripe electrodes and the second stripe electrodes are not parallel to each other, one end of each of the first stripe electrodes is electrically connected to the first trunk electrode or the second trunk electrode of the third electrode, the other end of each of the first stripe electrodes is electrically connected to one end of the corresponding second stripe electrode, the other end of each of the second stripe electrodes is electrically connected to the first trunk electrode or the second trunk electrode of the fourth electrode, and there is a slit between the first stripe electrode and second stripe electrode adjacent to each other.

34. The viewing angle switchable liquid crystal display panel of claim 33, wherein the first stripe electrodes are substantially parallel or perpendicular to the first light transmitting axis, and the second stripe electrodes are substantially parallel or perpendicular to the second light transmitting axis.

35. The viewing angle switchable liquid crystal display panel of claim 1, wherein the viewing angle switchable liquid crystal display panel comprises at least a first domain and at least a second domain, at least a part of the viewing angle control sub-pixels are disposed in the first domain, and at least a part of the viewing angle control sub-pixels are disposed in the second domain.

36. The viewing angle switchable liquid crystal display panel of claim 35, wherein under a narrow viewing angle display mode, the viewing angle control sub-pixels in the first domain are turned on and accompanied with side light leakage, and the viewing angle control sub-pixels in the second domain is turned off and accompanied with no side light leakage.

37. The viewing angle switchable liquid crystal display panel of claim 35, wherein under a narrow viewing angle display mode, the viewing angle control sub-pixels in the first domain and the second domain are turned on, and the viewing angle control sub-pixel in the first domain and the viewing angle control sub-pixel in the second domain are respectively accompanied with side light leakage in different directions.

38. The viewing angle switchable liquid crystal display panel of claim 35, wherein under a narrow viewing angle display mode, the viewing angle control sub-pixels in the first domain and the second domain are turned on, and the viewing angle control sub-pixel in the first domain is accompanied with side light leakage in the same direction with the side light leakage of the viewing angle control sub-pixel in the second domain, making the contrast ratio decreased in a side viewing direction under the narrow viewing angle display mode.

39. The viewing angle switchable liquid crystal display panel of claim 1, wherein the viewing angle switchable liquid crystal display panel comprises at least a first domain and at least a second domain, the viewing angle control sub-pixels are disposed in the first domain, no viewing angle control sub-pixels are disposed in the second domain, there is only one white color sub-pixel in the second domain, and under a narrow viewing angle display mode, the viewing angle control sub-pixels in the first domain are turned on and accompanied with side light leakage, and the white color sub-pixel in the second domain is turned off and accompanied with no side light leakage.

* * * * *